May 3, 1949.  H. PELPHREY ET AL  2,469,310
MACHINE FOR FORMING GEARS
Filed May 31, 1946  13 Sheets-Sheet 1

INVENTORS
Harry Pelphrey,
James Martin.
BY
Harness Dickey & Pierce
ATTORNEYS.

May 3, 1949. H. PELPHREY ET AL 2,469,310
MACHINE FOR FORMING GEARS
Filed May 31, 1946 13 Sheets-Sheet 6
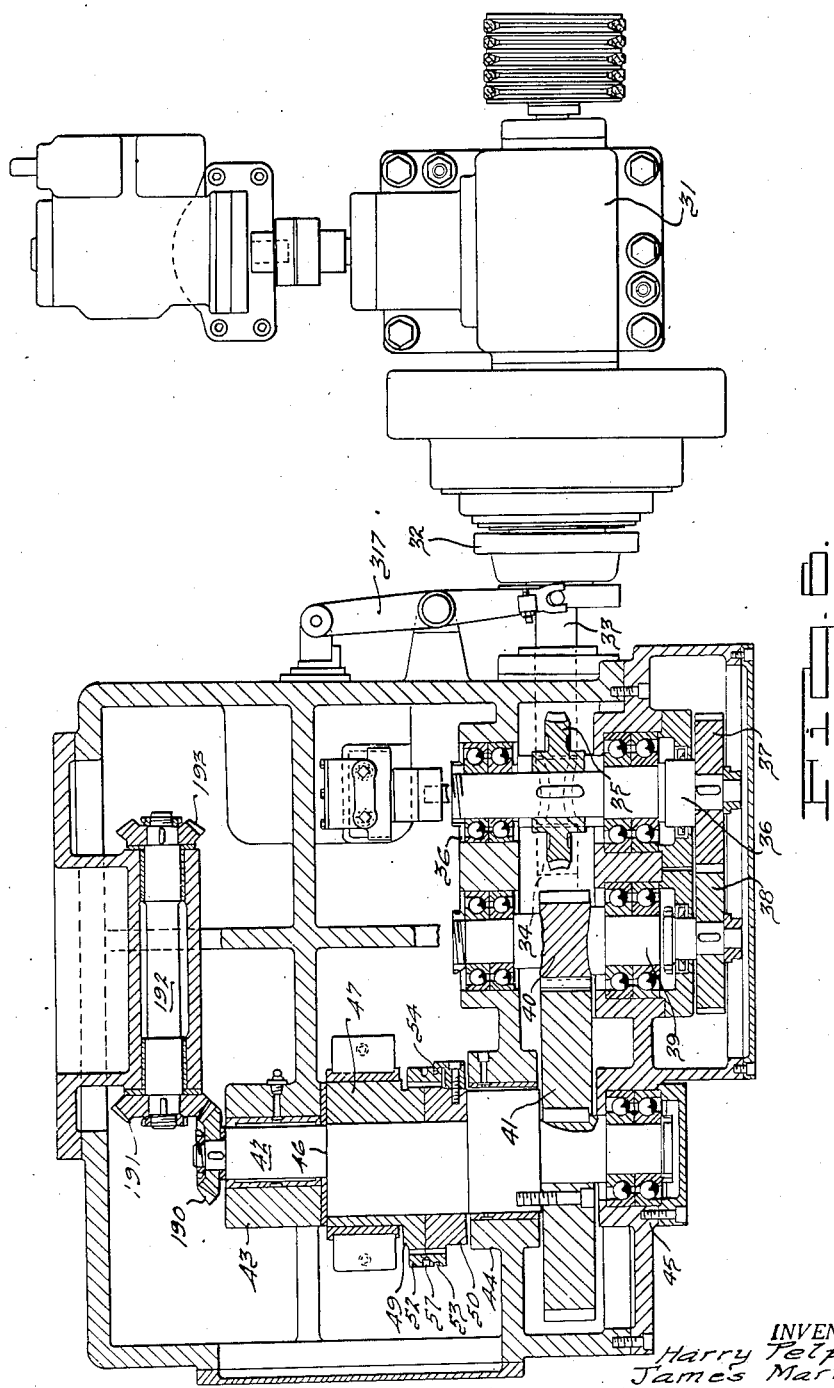
INVENTORS.
Harry Pelphrey,
James Martin.
BY
ATTORNEYS.

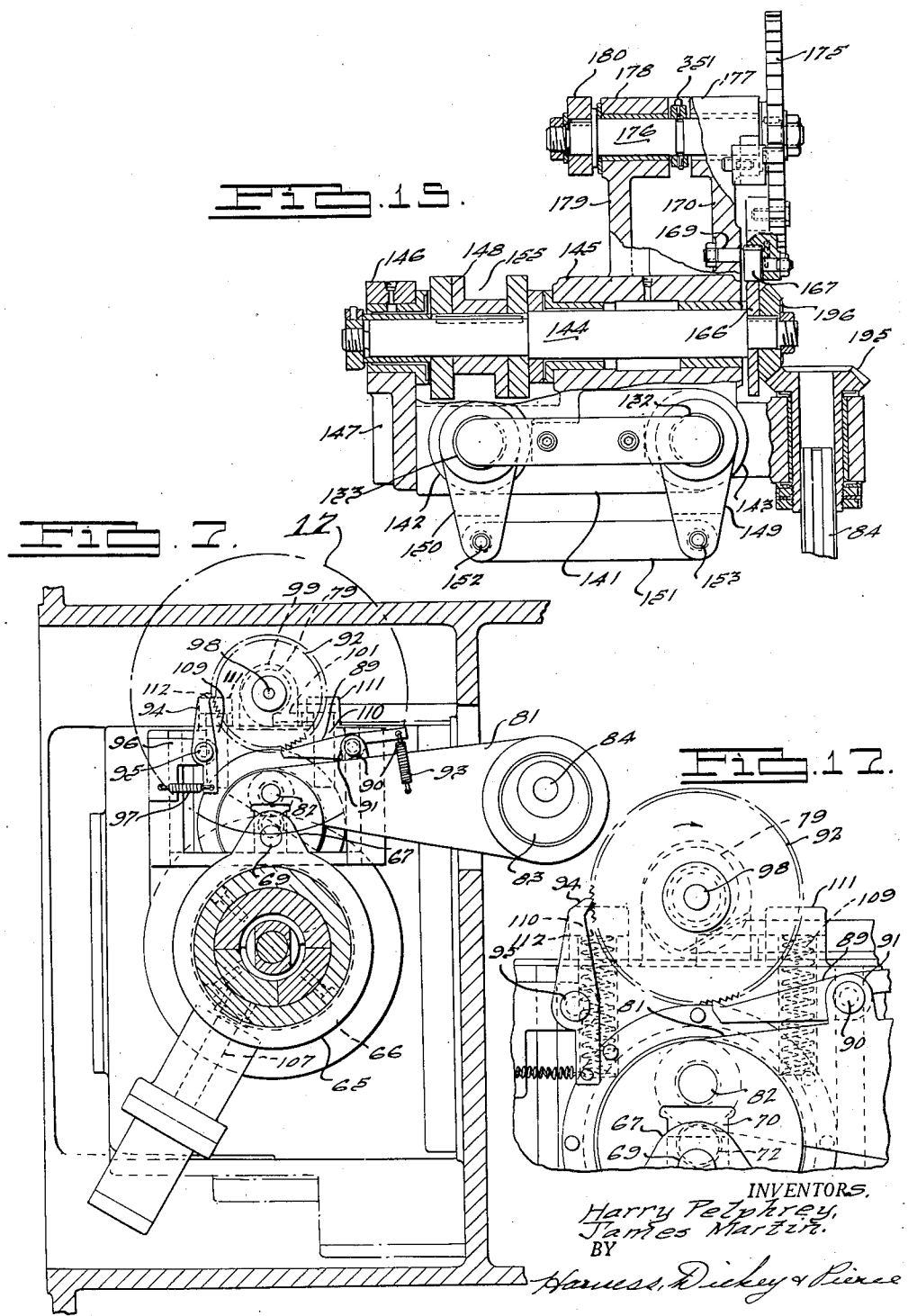

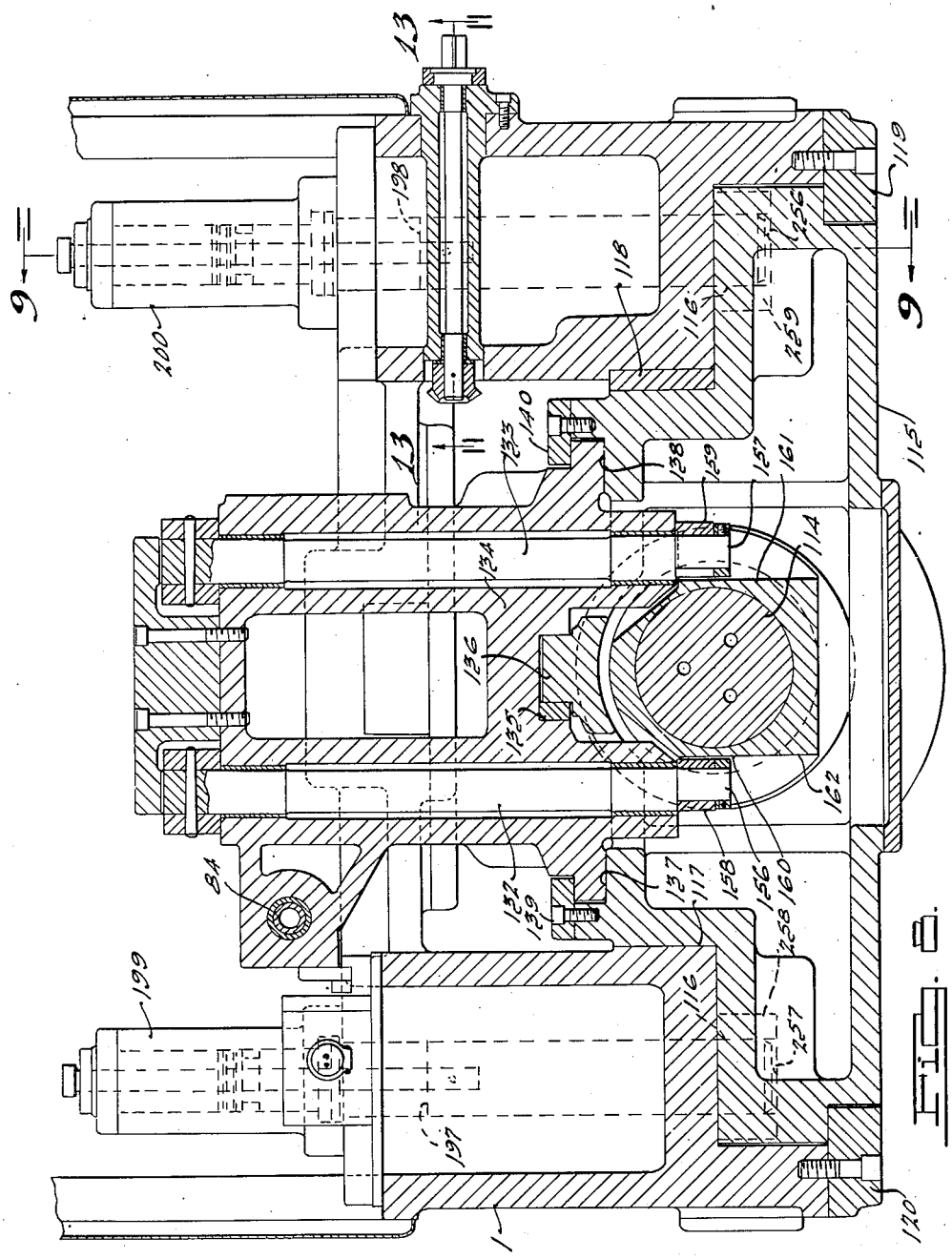

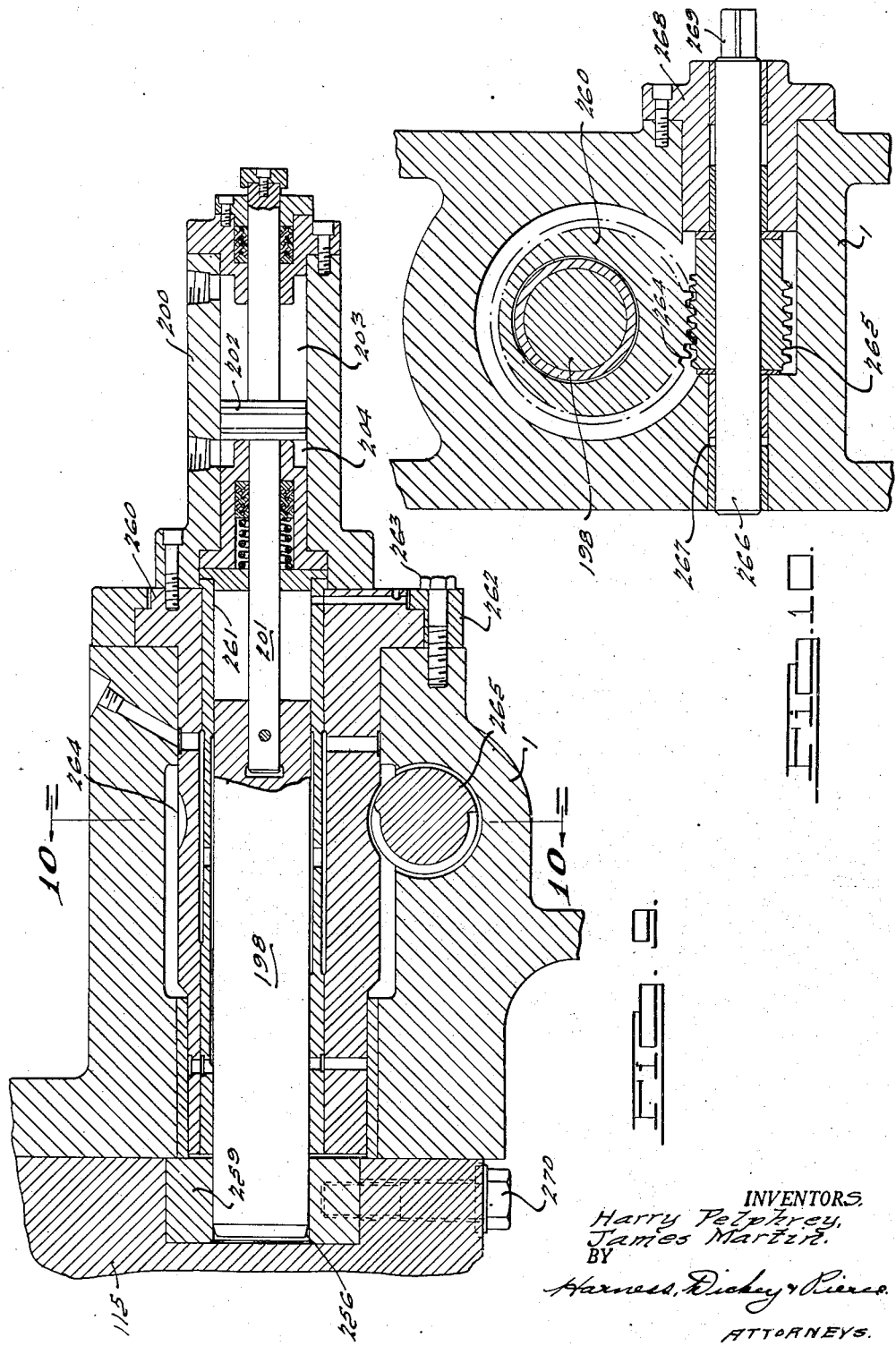

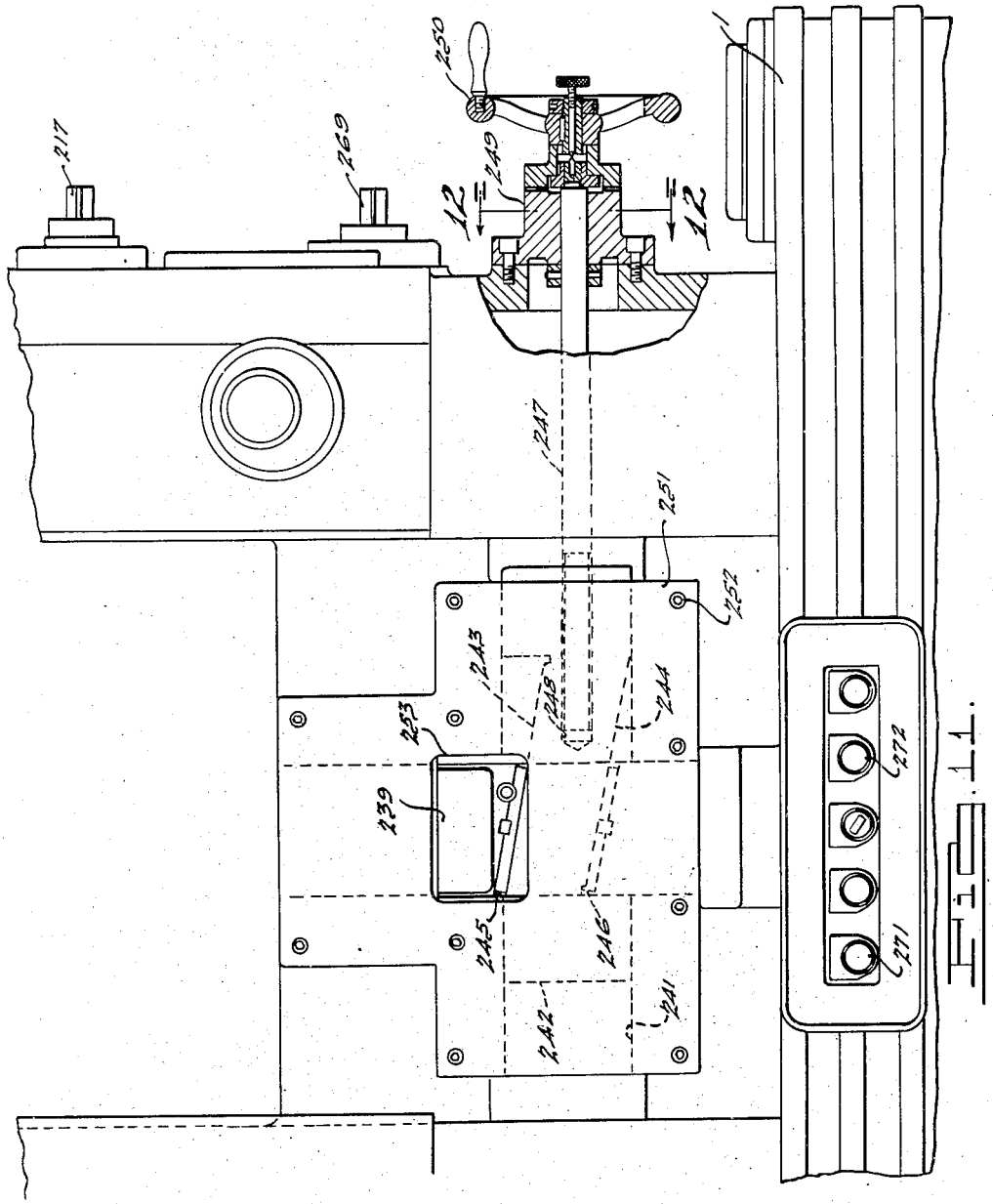

May 3, 1949.　　　H. PELPHREY ET AL　　　2,469,310
MACHINE FOR FORMING GEARS
Filed May 31, 1946　　　　　　　　　　　13 Sheets-Sheet 11
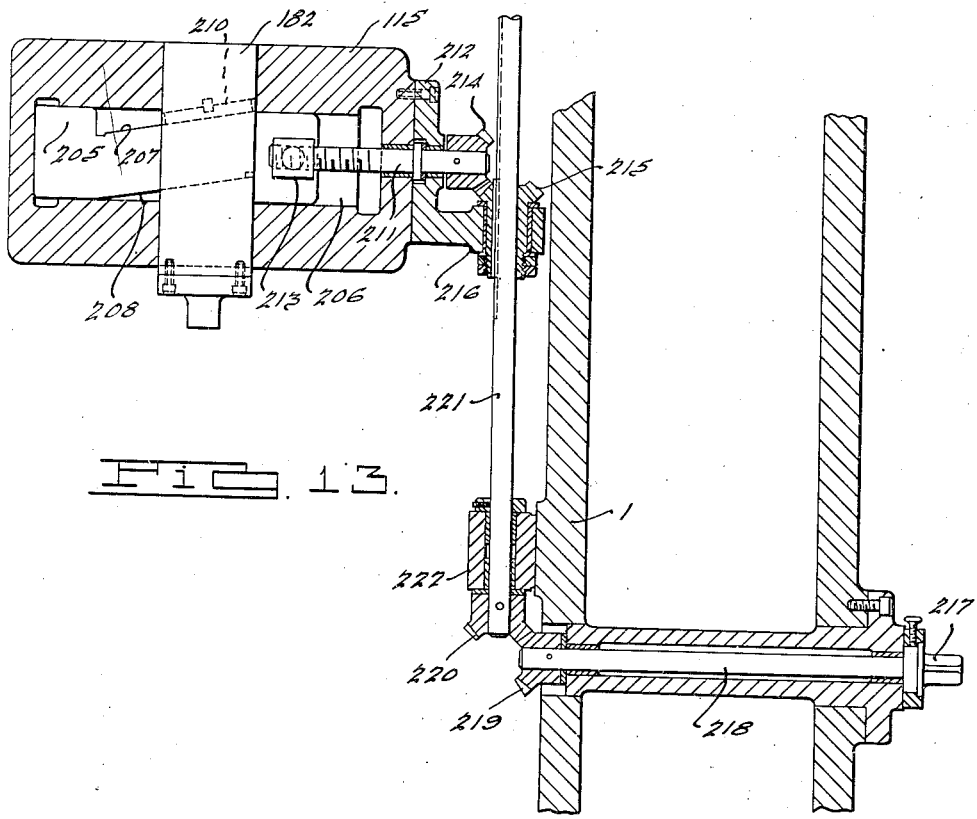
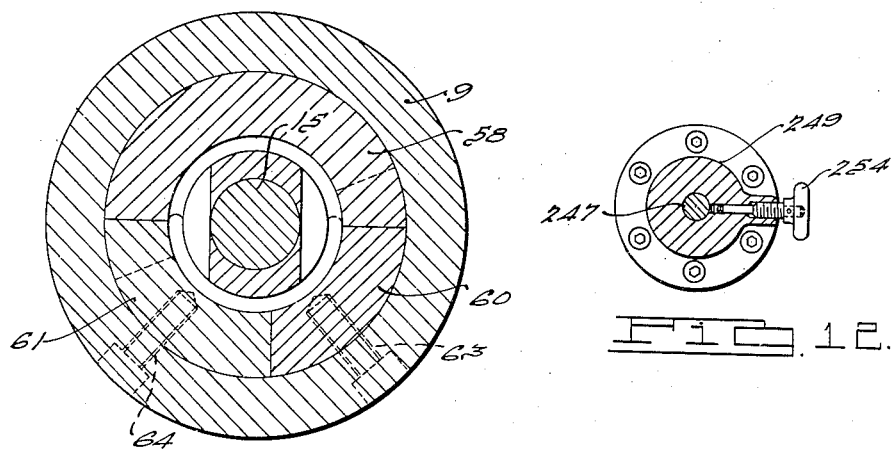
INVENTORS.
Harry Pelphrey,
James Martin.
BY
Harness, Dickey & Pierce
ATTORNEYS.

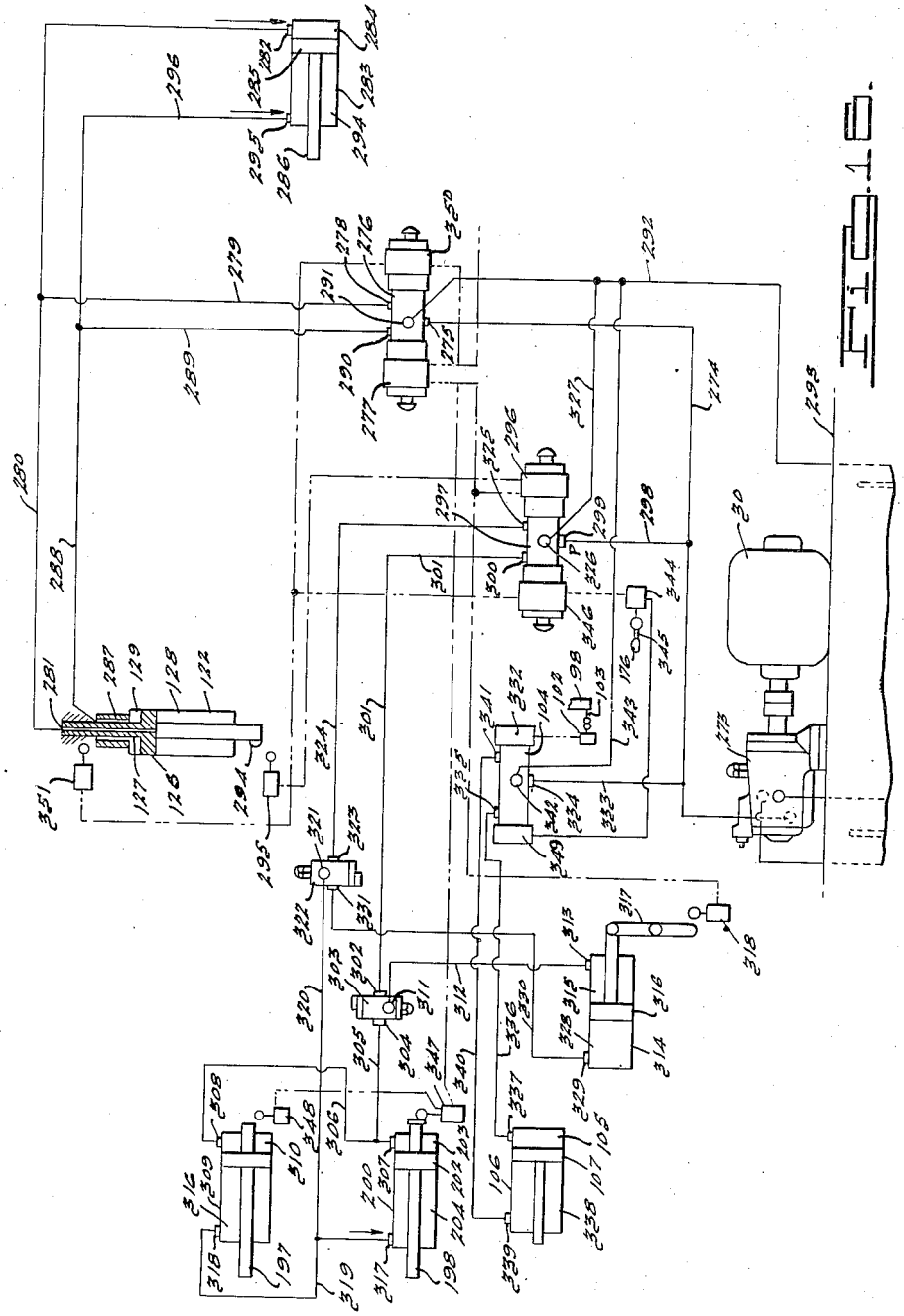

May 3, 1949.  H. PELPHREY ET AL  2,469,310
MACHINE FOR FORMING GEARS
Filed May 31, 1946  13 Sheets-Sheet 13
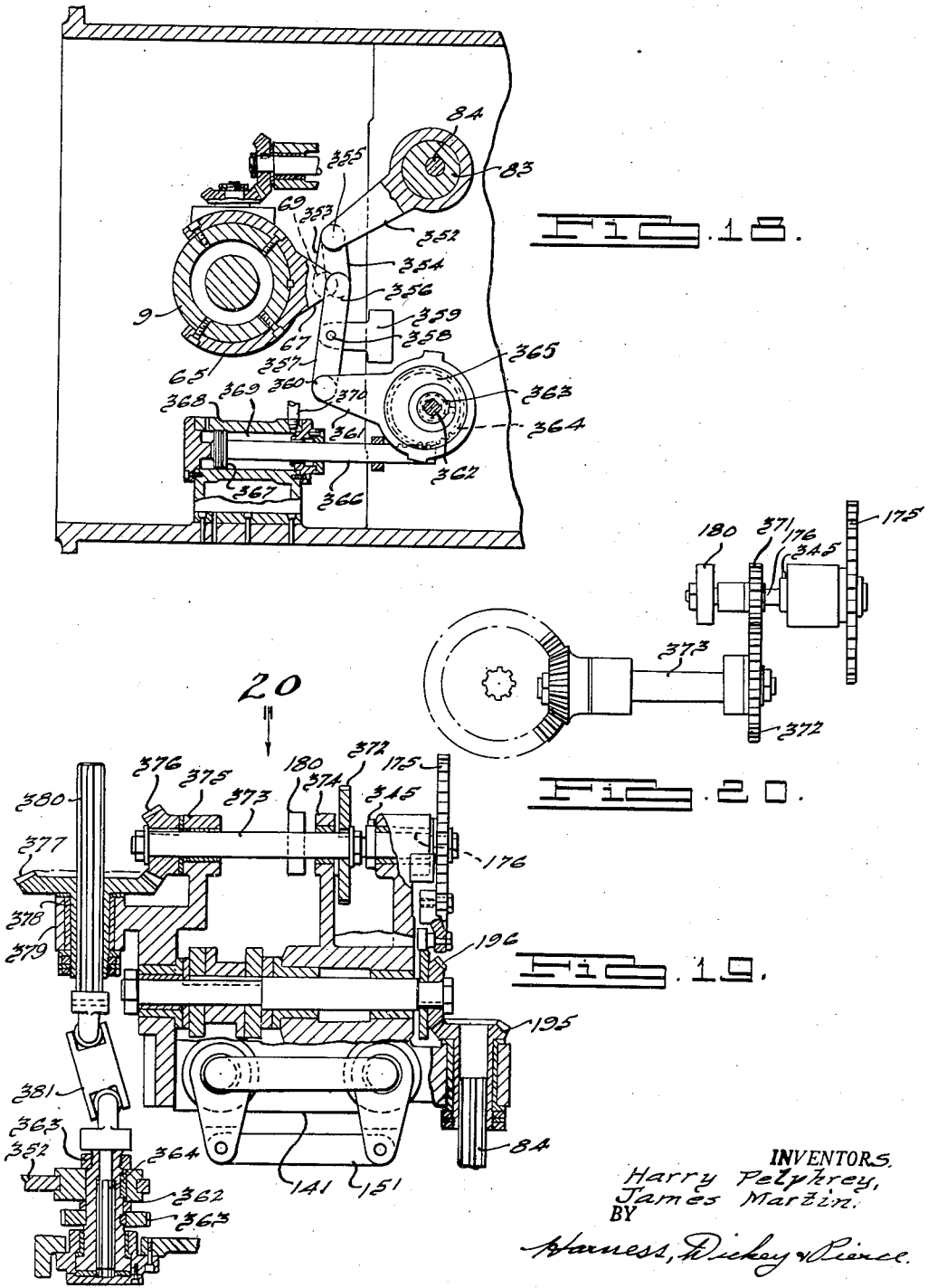
INVENTORS.
Harry Pelphrey,
James Martin.
BY
Harness, Dickey & Pierce.
ATTORNEYS.

Patented May 3, 1949

2,469,310

UNITED STATES PATENT OFFICE 2,469,310

MACHINE FOR FORMING GEARS

Harry Pelphrey, Detroit, and James Martin, Ferndale, Mich., assignors to Michigan Tool Company, Detroit, Mich., a corporation of Delaware Application May 31, 1946, Serial No. 673,366

17 Claims. (Cl. 90—10)

The present invention relates to a machine for forming gears, and has more particular relation to a machine for simultaneously forming all the teeth on a gear blank.

As is well known, it is conventional practice to form gears on a gear blank by means of a gear shaper, or to generate the same in a generating action between a hob and the gear blank. While it is possible to produce satisfactory gears by either of these methods, each is inherently slow, inasmuch as in either process the gear teeth are individually formed. It will be obvious, therefore, that the time consumed in producing a gear by either of the above methods is of importance even in the case of a gear with relatively few teeth, and will be increasingly more important in the case of gears having a substantial number of teeth.

In United States Letters Patent 2,346,867 to Harry Pelphrey, which patent is assigned to the assignee of this application, a machine for forming gears by which all of the teeth in the gear may be simultaneously formed on a gear blank is fully described and illustrated.

The present invention, although somewhat similar to the said Pelphrey patent, has been greatly improved and provides, among other things, novel and improved means for preventing interference between the cutting tools and a gear blank when forming a helical gear.

Consequently, the primary object of the present invention is to provide a machine for simultaneously forming all the teeth on a gear with which it is possible to form such teeth on a helical gear without interference between the cutting tools and the flanks of the teeth as the same are being formed.

Another object of this invention is to provide a construction with which it is possible to thus simultaneously form all the teeth of a helical gear without interference between the cutting tools and the flanks of the gear teeth by causing the cutting tools to contact the gear blank along a constant helical path for a predetermined part of the gear forming cycle. To accomplish this, means are provided to decrease the spiral angle which the gear blank follows as it reciprocates.

A further object of the present invention is to provide a machine for thus forming gears which is substantially automatic in operation.

A still further object of the present invention is to provide a machine for simultaneously forming all the teeth on a gear which may be operated by semiskilled or relatively unskilled labor to produce extremely accurate gears.

Further objects and advantages of our invention will be apparent from the description which follows when considered in connection with the accompanying drawings, in which like numerals indicate like parts wherever shown, and wherein:

Figure 6 is a section taken on line 6—6 of Figure 5 to show the driving mechanism interiorly of the base.

Figure 7 is a view taken substantially on line 7—7 of Figure 5 showing, in plan, the apparatus for decreasing the helix rotative movement of the gear blank.

Figure 8 is a section taken on line 8—8 of Figure 4 illustrating the apparatus for effecting reciprocation of the tool holder.

Figure 9 is a section on line 9—9 of Figure 8, illustrating one of the lock bars for retaining the tool head during reciprocation of the tool holder.

Figure 10 is a section on line 10—10 of Figure 9, showing the adjustment means for the lock bar.

Figure 11 is a view taken in the direction of arrow 11 shown in Figure 4, illustrating the apparatus for vertically shifting the head stop.

Figure 12 is a section on line 12—12 of Figure 11.

Figure 13 is a section on line 13—13 of Figure 8, illustrating the blade adjustment mechanism.

Figure 14 is an enlarged view of the ram and spiral guides shown in Figure 7.

Figure 15 is a section taken substantially on line 15—15 of Figure 4, showing the tool holder reciprocating cams and the ratchet for driving the tool advancement cam.

Figure 16 is a diagrammatic sketch of a hydraulic system which may be used to operate the gear forming machine of this invention.

Figure 17 is an enlarged view of the apparatus included in circle 17 on Figure 7.

Figure 18 is a sectional view similar to Figure 7 illustrating a modified form of the variable guide mechanism.

Figure 19 is a section similar to that illustrated in Figure 15, showing the apparatus for diminishing helical rotation of the gear blank, driven by the ratchet for advancing the cutting tools, in the modified form of the invention.

Figure 20 is a view taken in the direction of arrow 20 in Figure 19.

In the present invention, a construction is provided in which a plurality of circumferentially spaced, radially disposed cutters are mounted in a tool head in surrounding relationship to a gear blank. Such gear blank is mounted upon a reciprocating work holder and upon upward movement of such work holder, the gear blank is moved into cutting engagement with the cutters. These cutting tools are alternately fed radially inwardly and backed off during reciprocation of the work holder so that as the cutters are fed inwardly, all of the gear teeth are formed simultaneously. The cutters are of such shape that in the complete operation they remove entirely the interdental stock between the teeth formed thereby.

Although the specific embodiment of the invention herein described and illustrated is particularly applicable to forming helical gears, it will be obvious that a machine embodying the improvements of the present invention may be used to form other types of gears.

In order to thus simultaneously form the teeth on the helical gear, the present invention contemplates mounting the cutters at an angle to the axis of reciprocation of the machine element or gear blank. Such gear blank is partially rotated with respect to its longitudinal axis as it is reciprocated by the work holder. To effect this rotation, a reciprocating ram upon which the work holder is mounted is caused to rotate upon the helix of the gear to be cut. It will be appreciated, however, that the angular setting of the cutting tools with respect to the axis of reciprocation must correspond to the helix angle at the outside diameter of the gear to be formed. Obviously, as the cutting tool moves more deeply into the work piece, this helix angle must decrease as it is a function of the radius. The present invention contemplates providing apparatus for decreasing the helical rotative movement of work holder effected by the helical guides through part of the forming operation to prevent interference between the cutting tools and the flanks of the teeth being formed on the gear blank. The compensating action effected by this guide is greatest at the outer diameter of the gear blank, gradually diminishing as the radially disposed cutting tools approach the base of the gear teeth. As the tools reach a predetermined point in this inward travel, such action ceases and a locking means enters the ram guide housing, causing the gear blank to be rotated in accordance to the helical path of the gear to be formed thereon for the balance of the operation.

Figure 5:
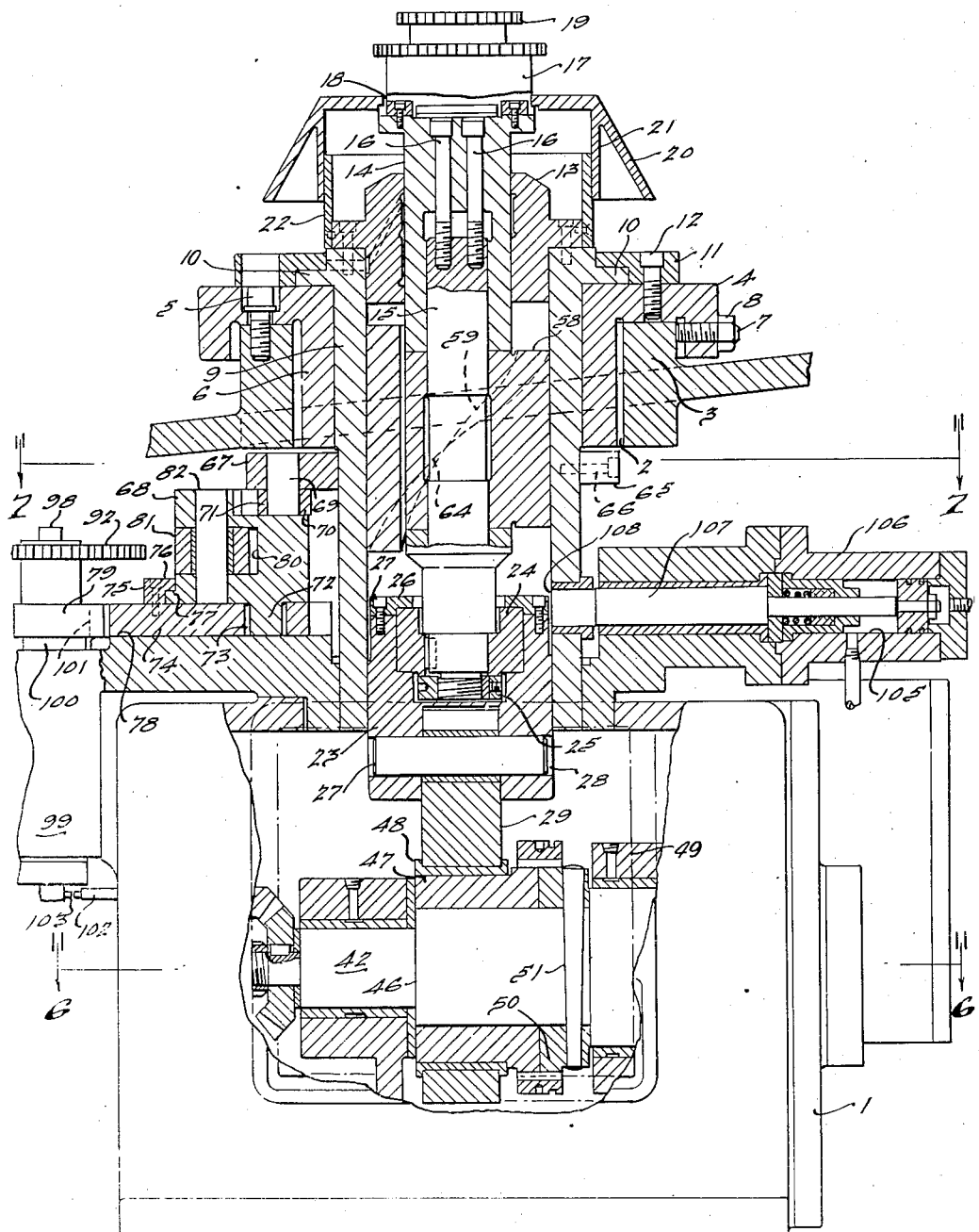
Figure 5 is a section taken substantially on line 5—5 of Figure 3 showing the apparatus for decreasing the spiral angle which the gear blank follows during part of the gear forming cycle.

To fully describe the machine of this invention, it is necessary to refer to the drawings in which a base is generally indicated at 1. Such base may be an integral, hollow casting suitably reinforced and providing doors through which access may be had to the mechanism located interiorly thereof. In order to provide for mounting the work holder and reciprocating means therefore, this base provides in the lower portion, annular opening 2 with surrounding boss 3. A locating ring 4 is integrally connected to the top of said boss by bolt 5 and provides annular wall 6 extending downwardly in such opening 2. At the right side of this locating ring 4, as may be seen in Fig. 5, is provided an adjusting stud 7 and lock nut 8. This stud and lock nut provide for a slight, lateral shifting of the locating ring upon said boss 3. It will be observed that the extent of this lateral shifting is limited to the clearance provided between bolt 5 and locating ring 4 at the point at which said bolt extends through the opening provided therefore in the ring.

A ram guide housing 9 is disposed within the annular opening provided by annular wall 6 to depend downwardly by means of shoulder portion 10 from the upper surface of the locating ring 4. As will hereinafter become more clear, this guide housing may be rotated about its longitudinal axis, and for this reason shoulder 10 thereof is secured to said surface of ring 4 by means of shoulder cap 11 which permits such rotation. This shoulder cap 11 is in turn secured to the locating ring 4 by means of bolt 12, one of which is shown in Fig. 5.

At the top of the guide housing 9, the ram guide 13 is integrally connected thereto for slidably receiving ram extension 14 which is fixed to the top of ram 15 by means of bolts 16. A work holder 17 is rigidly connected to the upper extremity of said ram extension 14 by bolt 18, and provides for clampingly receiving and holding therein the gear blank 19 in a manner to be hereinafter described.

In order to prevent chips from entering the gear forming apparatus, a chip deflector 20 is anchored to the base of work holder 17 for reciprocation therewith. Such chip deflector provides interiorly thereof a downwardly directed portion 21 which is adapted to receive cylindrical guard 22 fixed to the outer diameter of ram guide 13. In this manner, such gear forming machine is protected from chips during the reciprocation of the work holder.

In the lower portion of the guide housing, ram swivel connection 23 is slidably disposed. At the bottom end of ram 15, thrust bearing 24 is anchored thereto by means of lock nut 25 which threadably engages a threaded end of ram 15, and thus held to the ram. This thrust bearing is received within swivel connection 23. An end plate 26, anchored at the top of swivel 23, abuts the upper surface of bearing 24 to rigidly secure the same to the swivel. This swivel connection 23 provides mating openings through which crank pin 27 passes to hold the crank 29 within opening 28 of said swivel.

With the work holder thus integrated to the crank 29, reciprocation thereof is accomplished in the following manner. A prime mover in the form of an electric motor 30 (Figure 16) drives suitable gearing in gear box 31 to drive clutch 32 and through such clutch, shaft 33. This shaft 33 drives worm 34 to drive worm gear 35 fixed to shaft 36, overlying and perpendicular to said shaft. A gear 37, secured to shaft 36, meshes gear 38 on shaft 39 of which gear 40 is an integral part. Such gear 40 in turn meshes gear 41 keyed to crankshaft 42 for driving the crankshaft. It will be observed that crankshaft 42 is journaled for rotation upon suitable bearings carried in the bearing housings 43, 44, and 45, respectively, and that such crankshaft provides an eccentric shoulder at 46. The eccentric shoulder 46 is rotatably received within an opening provided in adjustable eccentric 47. This eccentric ring which is adjustable is received within bearing 48 provided in arm 29. Obviously, as crankshaft 42 is caused to rotate, the eccentricity of shoulder 46 will effect crank 29 to reciprocate causing the work holder to reciprocate therewith.

As a means for varying the length of the stroke of crank 29 to accommodate various gear widths, adjustable eccentric 47 has a gear portion 49 thereon. The face of gear 49 abuts face of gear 50 which is secured by means of tapered pin 51 to the eccentric shoulder 46 of crankshaft 42. It will be observed therefore, that while adjustable eccentric 47 may be rotatably shifted about shoulder 46, gear 50 may not be moved. An internally tooth gear 52 is disposed to mesh the teeth of both gears 49 and 50. Such internal gear 52 provides groove 53 extending around the periphery of such gear in which the finger 54 of locator 55 is received. This locator 55 is anchored by means of bolt 56 to gear 50, and it will be appreciated that finger 54 following groove 53 in the gear 52 will prevent this gear from leaving the teeth of its meshing gears. By inserting a pin in one of the drill openings 57 found on the outer diameter of gear 52, such gear may be rotated. As gear 52 is rotated in this manner, gear 49 will rotate therewith, causing the adjustable eccentric 47 to rotate about shoulder 46. Adjustment of eccentric 47 by such means, of course, changes the stroke of crank 29 to accommodate various gear widths.

As the ram 15, together with work holder 17 and gear blank 19 are reciprocated, it is also turned or rotated with respect to its longitudinal axis. This provision is made so that any point on the periphery of the gear blank follows the path of the helix of the gear to be formed thereon.

In order to effect such turning, a second guide means is disposed within guide housing 13. Such guide means include a spiral guide 58 which is fixed to the stem of ram extension 14. Such guide 58 has a spiral guide surface 59, which has a contour following the helix of the gear to be formed on the gear blank. Complementary spiral guides 60 and 61 are fixed to the guide housing 9 by means of bolts 62 and 63, respectively. The guides 60 and 61 have a spiral guide surface 64, which cooperates with the guide surface of guide 58 to properly guide the ram as the same reciprocates and is rotated upon the helix of the gear to be formed on the gear blank.

It will be appreciated that although the lead angle of a helical gear remains constant, the helix angle of such type gear varies with the radius. That is to say, the helix angle of such type gear is less at the base circle thereof than at the outer diameter. This variation in helix angle, it has been found, causes interference between the cutting tools and the flanks of the gear teeth being formed on the gear blank when a helical gear is being produced. The machine of this invention provides novel means for preventing such interference.

In order to accomplish this desirable result, annular ring 65 is secured to guide housing 9 by a plurality of bolts 66. As may be seen in Figures 5 and 7, ring 65 provides at the left side, an integral lever 67. Such lever 67 overlies a portion of pivot block 68 and is operatively associated with such pivot block 68 by means of pin 69 which is rotatably received in an opening provided therefor in such lever arm 67. This pin 69 is rotatably received in slide block 70 which is slidably positioned within slot 71 provided in pivot block 68. At the lower end of pivot block 68, pivot 72 is machined thereon and this is rotatably received within the bushing 73 carried in an opening provided in slide plate 74. A guide block 75, the shoulder 76 of which engages a shoulder portion 77 of pivot block 68, permits such block 68 to move about pivot 72, but prevents the same from coming out of the opening provided therefor. This slide plate 74 is mounted to be slidably moved by cam 79 on machine surface 78 of base 1. Said movement serves to move pivot 72 until the same is vertically below pin 69, as will hereinafter become more clear.

Pivot block 68 also provides a U-shaped slot 80 in which the small end of crank 81 is adapted to register to be held therein by means of pin 82 which extends through mating openings in such block and lever arm. The large end of crank 81 rotatably receives adjustable eccentric 83. Such eccentric 83 is rotatably supported on shaft 84. The driving of shaft 84 for effecting rotation thereof is to be later explained in connection with the downfeed slide mechanism.

Rotation of shaft 84 effects rotation of internal gear 85 keyed to said shaft. Such gear 85 is held by integral shoulder 86, from gear 87, which is also integral with such eccentric, in mesh with the teeth on gear 87 for driving the eccentric. It will be appreciated then that as shaft 84 rotates, the eccentric 83 will rotate therewith in timed relation thereto. This eccentric 83 effects movement of crank 81, which in turn causes pivot block 68 to oscillate about pivot pin 72.

With the pivot pin 72 in the position indicated in Figure 5, it will be observed that movement of crank 81 causes pivot block to move arcuately about pivot 72. Such arcuate movement effects a similar movement of pin 69. However, it will be appreciated that inasmuch as pins 69 and 82 are on opposite sides of the pivot 72, each will move oppositely. This movement of pin 69 is imparted to lever 67, effecting oscillation of guide housing 9 about its longitudinal axis, as such housing is fixed to ring 65 of which lever 69 is an integral part.

As such guide housing rotates in a direction opposite to that in which the arm is rotated by the spiral guides, the helix angle developed by such rotation of the ram is reduced inasmuch as the guides 60 and 61 fixed to the guide housing rotate therewith serving to cause guide 58 to follow a reduced spiral angle. As will hereinafter become more clear, the extent of this counter rotation decreases as the cutting tools approach the base circle of the gear being formed for the helix angle of the gear, of course, decreases in from the outside diameter to the base circle. This counter rotation permits the cutting tools to contact the gear blank along a constant helical path, permitting infeed and backoff of the tools without interference between the same and the flanks of the teeth due to a varying helix angle. Rotation of the guide housing opposite to the counter rotative movement thereof returns the mechanism in readiness for the next counter rotative movement in timed relation to the next stroke of the ram.

Gradual diminishing of the oscillatory movement of guide housing 9 is accomplished in the following manner. As crank 81 is moved by means of eccentric 83, pawl 89, pinned at 90 to ear 91, projecting sidewardly from crank 81, engages ratchet wheel 92. A spring 93, attached to one end of ratchet 89 and to crank 81, insures constant engagement between the pawl 89 and said ratchet wheel 92. Thus, as said crank 81 moves in one direction, it effects rotation of ratchet wheel 92 by means of pawl 89. A second pawl 94, pivotally supported at 95 upon arm 96 provided on base 1, is held by means of spring 97 in engagement with the previously described ratchet wheel 92. This pawl prevents ratchet 92 from rotating in an opposite direction to that effected by pawl 89. Such ratchet 92 is fixedly secured to shaft 98 which is journaled for rotation within housing 99 extending outwardly from base 1. Also mounted upon shaft 98 for rotation therewith is the previously named cam 79. Such cam 79 is provided with shoulder 100 which brings said cam directly in line with cam follower 101 which is integral with slide plate 76. As the cam 79 rotates, it thereby moves plates 76 inwardly, carrying pivot block 68 with it until pivot point 72 is directly below the vertical center of pin 69. When this occurs, oscillation of lever 67 ceases, and hence oscillation of guide housing 9 also stops. At that instant, a limit switch 102 is contacted by button 103 on the lower end of shaft 98. This contact of the limit switch effects shifting of solenoid valve 104 permitting fluid to enter chamber 105 of the hydraulic cylinder 106. As the fluid enters this chamber, it forces piston 107 carried by such cylinder into opening 108 provided in guide housing 9 for preventing further rotation of said guide housing. This locking of the guide housing occurs at a predetermined point of the gear forming operation, depending upon the stroke of crank 81 which may be varied in accordance with the diameter of the gear being formed by adjusting the position of eccentric 83. After this locking action occurs, the balance of the forming operation is completed with the ram rotating by virtue of the spiral guides.

Positive engagement of follower 101 on slide 76 and cam 79 is provided by springs 109 and 110. Such springs are housed within openings provided therefor in the base 1, to bear upon downwardly directed members 111 and 112 on slide plate 76, urging said follower on the slide plate against the cam.

In order to vary the movement of crank 81 in accordance to the diameter of the gear to be formed, eccentric 83 is rotatably adjustable, which varies the stroke of such crank. To accomplish such adjusting rotation of eccentric 83, gear 85 is moved upwardly on shaft 84. This frees gear 87 from gear 85 and, of course, permits eccentric 83 to be rotated as a pin or other suitable means is inserted in the drilled opening 88 provided in the shoulder portion of such eccentric. Such adjustment of eccentric 83 changes the stroke of crank 81 to vary the extent of the oscillation of lever 67. Inasmuch as lever 67 is an integral part of annular ring 65, it will be appreciated that the oscillation of guide housing 9 will be effected. In this manner, such oscillation may be controlled in accordance with the radius of the gear being formed on such machine.

Thus, by means of reducing the helix angle at the line of contact between the cutting tools and the gear blank with the novel and improved means of this invention, it is possible to simultaneously form all the teeth on a helical gear without interference to the cutting tools and the gear blank.

In order to form the teeth in the gear blank 19 in the manner described, a plurality of circumferentially spaced, radially disposed cutters or tools 113 are mounted in a tool holder 114. This tool holder includes means for controllably feeding the tools 113 radially inwardly and backing off such cutting tools with respect to the gear blank. Inasmuch as such cutting tools and cutting head are similar to those described in the patent to Harry Pelphrey which has been previously mentioned in the foregoing, they will not be further described here. However, the machine of this invention provides novel and improved means for effecting reciprocation of the tools to effect such feeding and backoff of the same and such means will be described at this point.

A head assembly for mounting the cutting tools is provided in the upper portion of the machine. Such assembly which is generally indicated at 115 is mounted for slidable movement toward or away from gear blank 19 in order to provide for loading and unloading such gear blanks. To provide for such slidable movement, base 1 provides on the upper portion thereof machined surfaces at 116 and 117 for thus mounting said head assembly 115. A gib is provided at 118 and keeper bars 119 and 120 secure said head to the base.

To accomplish this sliding movement of head 115, an integral hydraulic cylinder 121 is provided interiorly of said head. A ram 122 is anchored to the lower end of cylinder 121. A shoulder portion 123, provided in ram 122, receives annular cap 124 to close said end cylinder 121 when the ram is secured thereto. Closing of the upper opening in said cylinder 121 is accomplished by means of a cap member 125 anchored to said upper part of the cylinder. Within cylinder 121, piston 126 is secured to shaft 127 which in turn is anchored to the upper part of base 1. It will be appreciated, therefore, that as fluid is introduced into chamber 128 of the head, assembly 116 will be moved downwardly and, likewise, when fluid is introduced into chamber 129 provided in said cylinder 122, the head will be effected to move upwardly.

As in United States Letters Patent 2,346,867 to Harry Pelphrey, previously noted above, the infeed and backoff movement of the cutting tools contained within previously mentioned tool head 113, is effected by means of an outer cone 130. This cone 130 is anchored to the bottom of a sleeve member 131 for movement therewith. Such sleeve member 131 is disposed in surrounding relationship to ram 122 for reciprocation in a direction of the longitudinal axis of such ram by means of eccentric shafts 132 and 133.

To provide for such reciprocation, carriage 134 is mounted within head 115 for independent movement in a direction parallel to the longitudinal axis of ram 114 as will hereinafter become more clear. Such carriage is gibbed at 135 to an appendage 136 of head 115 and secured to machine surfaces 137 and 138 of said head by means of keeper bars 139 and 140. An outwardly and rearwardly projecting portion 141 which is integral with carriage 134 provides bearing housings 142 and 143, respectively, in which the previously described shafts 132 and 133 are journaled for rotation in suitable bearings. A shaft 144 is journaled for rotation in an overlying position with respect to shafts 132 and 133 and normal thereto in bearing housing 145 which is integral with projection 141 and bearing housing 146 on bracket 147 anchored to said projection 141. Such shaft 144 rotatably supports cam 148. A rocker arm 149 is keyed to shaft 132 and double rocker arm 150 is keyed to shaft 133. A link 151, pinned at 152 to rocker arm 150, and at 153 to rocker arm 149, effects simultaneous rotation of shafts 132 and 133. On the upper arm of double rocker 150, a rotatable follower 154 is secured. Such follower 154 is adapted to be received within groove 155 provided on cam 148, and it will thus be observed that as such cam rotates the follower 154 will effect arm 150 to oscillate about its central point. Oscilation of arm 150 will be transmitted by means of the link 151 to arm 149 serving to cause partial rotation of shaft 132 in a manner similar to the partial rotation of shaft 133.

Such rotation of shafts 132 and 133 effects rotation of eccentric shoulder 156 on shaft 132 and eccentric shoulder 157 on shaft 133. Such eccentrics are journaled for rotation in blocks 158 and 159 respectively. Such bearing block 158 is received within groove 160 and, likewise, bearing block 159 is received within groove 161, each of which grooves is formed in the machined section 162 of sleeve 131. It will be appreciated that this partial rotation of such eccentrics will effect a reciprocatory movement of sleeve 131. Inasmuch as the outer cone 130 is secured to sleeve 131, and the feed ring 163 is in turn secured to the outer cone, it can be seen that as the depending end 164 of such feed ring enters groove 165 provided in cutting tool 112 such cutting tool will be moved inwardly on a down stroke and will, likewise, be backed off on an up stroke. Considering now that the means for accomplishing this reciprocation of sleeve 131 is driven by the driving means for effecting reciprocation of gear blank 19, as will later be described, it is apparent that the infeed and back-off of the cutting tools occur in timed relation to such reciprocation of the gear blank.

Obviously, in order to form a gear with the machine of this invention, it is necessary to advance the cutting tools radially toward the center of the gear blank as the same are fed in and backed off during the reciprocation of said gear blank. To accomplish advancement of the tools, a second cam 166 is rotatably supported at one end of shaft 144. A follower 167 is rotatably supported on arm 168 to roll on the periphery of such cam 166 and to pivot arcuately about bolt 169 in said arm 168. Arm 168 is supported by means of bolt 169, which forms such pivot, to an upwardly directed arm 170 integral with the bearing housing 145. A spring 171, attached to arm 168 and to the projection 141 of carriage 134, insures that cam 166 and follower 167 remain constantly engaged. A pawl 172 is secured to arm 168 by means of bolt 173 and spring 174. Such pawl thus mounted is adapted to engage the serrations of ratchet wheel 175 rotatably supported upon shaft 176. This shaft 176 is journaled for rotation upon suitable bearings within the bearing housing 177 and 178 formed on the upwardly-directed arms 179 and 179 which are integral with projection 141 of carriage 134.

At the opposite end of the shaft 176, tool advancement cam 180 is rotatably mounted. From the foregoing, it will be appreciated that as cam 166 rotates, it effects arcuate movement of roller 167, causing ratchet 172 to partially rotate ratchet wheel 175 each time said cam 166 completes one revolution. As ratchet 175 is rotated in this manner, it effects rotation of cam 180. Cam 180 contacts follower 181 anchored in a depending position from vertical wedge 182 which is disposed in a rear portion of head 115.

Inasmuch as head 115 is held stationary in a down position during the operation of the machine, it may be appreciated that rotation of the cam 180 against the follower 181 will effect carriage 134 to move downwardly against spring 183. This independent downward movement of carriage 134 effects outer cone 130 to move downwardly in the outer retainer ring 184 surrounding tool head 114. Such movement of the cone effects the depending end 164 of feed ring 163 to enter more deeply into groove 165 in the cutting tool, serving to cause said tool to approach the center of the gear blank without in any way effecting or interfering with the infeed and backoff of such tools due to the reciprocation of sleeve 131.

The spring 183 is retained within opening 185 provided in head 115 by means of plug 186. Such spring 183 resiliently urges cam 180 into contact with follower 181 at all times, and the force exerted by said spring against carriage 134 may be varied by turning plug 186 which threadably engages opening 185, either inwardly or outwardly depending upon the pressure desired.

Adjustment is provided by shield 187 to control the rate at which the cutting tools are thus advanced. Such shield 187 is held by the slidably movable bolt 188 positioned in the arcuate slot 189, provided in a rearwardly-directed ear of arm 170, to be moved to cover a desired number of serrations on the ratchet. Then as pawl 172 moves upwardly, it is received in the first serration open to it, thereby effecting rotation of the ratchet. Obviously, the sooner pawl 172 enters the serrations on such ratchet, the greater the rotation thereof, and likewise, later engagement produces less rotation, thereby effectively controlling advancement of the tools.

In order to drive the cutting tool infeed and backoff and advancement mechanism just described in timed relationship with reciprocation of the gear blank 19, driving of such mechanism is effected by means of the previously described shaft 84. Such shaft 84 is driven directly from crankshaft 42 in the following manner. At the left end of the crankshaft 42, as may be seen in Figure 6, bevel gear 190 drives bevel gear 191 secured to shaft 192 for driving the same and bevel gear 193 at the opposite end of said shaft. Gear 193, in turn, drives gear 194 which receives the splined end of shaft 84 for driving the same. Such shaft 84 drives the previously described eccentric 83 and gear 195 splined thereto for driving bevel gear 196 on shaft 144 which effects the driving of the cutting tool feeding mechanism.

As stated in the foregoing, during this reciprocation of sleeve 131 and tool advancement, head 115 is locked in down position. Such locking is accomplished by means of lock bars 197 and 198 which are contained within hydraulic cylinders 199 and 200, respectively, mounted at the rear of such head 115. In Figure 9, a section through one of such hydraulic cylinders is shown to illustrate the operating mechanism interiorly of such cylinders. It will be seen in this figure that the lock bar 198 is attached to a piston rod 201 within such cylinder 200, and that piston rod 201 is provided with a piston 202 which will be moved inwardly as fluid is introduced into chamber 203. Such inward movement effects the lock bar to move into a locking position with head 115 for rigidly and positively holding such head in a down position. It may also be seen that as fluid is introduced into chamber 204 of such cylinder 200, lock bar 198 will be removed from the locking position permitting the head to moved upwardly at the termination of the forming operation. The operation of lock bar 197 is exactly identical to that of 198 and inasmuch as the operation of each is interdependent upon the other, it is to be appreciated that the action of each is simultaneous to effect such locking action of head 115.

In order to accommodate gears of varying diameters, the previously described wedge 182 may be moved upwardly or downwardly, depending upon the size of the gear to be formed. Movement of such wedge effects a similar movement of carriage 134, as it may be seen by referring to the description of the tool advancement mechanism, cam follower 181 is constantly in engagement with the tool advancement cam 180. If, for example, a gear of relatively small diameter is to be formed with a machine of this invention, it would be necessary to effect the downward movement of carriage 134 by means of vertical wedge 182, causing outer cone 130 to move downwardly in outer ring 184. Such downward movement of the outer cone 130 would effect a similar movement of retainer ring 163 for causing depending end 164 of such ring to enter more deeply into groove 165 of cutting tools 113. This adjustment would cause such tools 113 to move inwardly to effect the cutting of such small gear, without in any way affecting the infeed, backoff, or advancement of such cutting tool. In a similar manner, if a gear of relatively large size were to be cut, the vertical wedge would be moved upwardly effecting a similar upward movement of carriage 134 by virtue of the force exerted upon the bottom of said carriage by spring 183. Such adjustment would effect the cutting tools to be removed in an outward manner for cutting a larger gear.

This vertical adjustment of the vertical wedge 182 is accomplished upon laterally moving wedge 205 in groove 206 provided in head 115 for such wedge 205. Wedge 205 provides inclined surfaces 207 and 208 which are adapted to slide within groove 209, provided in the vertical wedge 182, as wedge 205 moves in groove 206. Inasmuch as the weight of wedge 182 rests upon the upper surface 207 of the wedge 205, a hardened wear plate 210 is keyed within groove 209 to prevent undue friction from interfering with the sliding action of said wedge 205.

Such sliding movement of wedge 205 is effected by means of the rotatable feed screw 221. The feed screw 211 is journaled for rotation upon suitable bearings carried by head 115 and bracket 212 anchored to such head. A lead nut 213 secured to one end of the wedge 205 threadably engages such feed screw 211 and it will be obvious that as such feed screw is rotated, the lead nut will move along the same effecting lateral shifting of the wedge 205. As such wedge 205 shifts laterally, the inclined surfaces 207 and 208 effect a vertical movement of vertical wedge 182 to effect shifting of carriage 134.

Rotation of feed screw 211 is effected upon rotation of the bevel gear 214 by the meshing bevel gear 215 journaled in bearing housing 216 for rotation therein. In order to rotate this gear 215, a wrench or other suitable means may be applied to the squared end 217 on shaft 218 for rotating the same and with it, bevel gear 219 secured thereto. Gear 219 meshes bevel gear 220 integrally connected to shaft 221 which is journaled for rotation in bearing housing 222. This shaft is keyed to gear 215 and effects rotation of such gear.

After carriage 134 is adjusted to a predetermined position, vertical wedge 182 may be locked against further movement by means of pin 223 which bears against the surface of said vertical wedge 182. Such pin 223 is slidably positioned within an opening provided therefor in cover 224, which cover is secured to a portion of head 115 for maintaining the vertical wedge 182 in position. A smaller end 225 of pin 223 is secured by means of screw 226 within an opening provided in post 227 which is held in a position perpendicular to vertical wedge 182 by means of shaft 228. Such shaft 228 is anchored by means of cover 224 to head 115 and provides at 229 a threaded end to threadably receive the ratchet nut 230. As ratchet nut 230 is turned in one direction, it effects post 227 and thereby pin 223 to move inwardly pressing upon vertical wedge 182 for securely and positively locking the same against movement. Rotation of nut 230 in an opposite direction effects the pressure exerted by pin 223 against the vertical wedge 182 to be relieved, after which such member may be moved to adjust the cutting tool.

This rotation of ratchet nut 230 may be accomplished by handle 231, the upper end of which receives said nut. Such handle has elongated pin 232 with end 233 thereon adapted to be resiliently urged between serrations 234 of nut 230 by spring 235. The spring 235 encircles pin 232, pressing upon collar 236 on such pin and ear 237 of handle 231 to bring about this engagement. When end 234 is engaged in this manner, handle 231 may be turned to effect the desired rotation of nut 230. Removing end 234, by moving the pin downwardly, prevents further rotation of ratchet nut 230 until it is again necessary to shift vertical wedge 182.

Inasmuch as the effectiveness of the cutting tools 113 depends upon the sharpness of the cutting edges 238, it will be quite obvious that such cutting surfaces must be sharpened from time to time. It will be appreciated, therefore, that the depth of the cutting tool will be slightly decreased each time the same is sharpened. In order to compensate for this decrease in depth of the cutting tool, an adjustment is provided whereby the entire head assembly 115 may be lowered.

Figure 4:
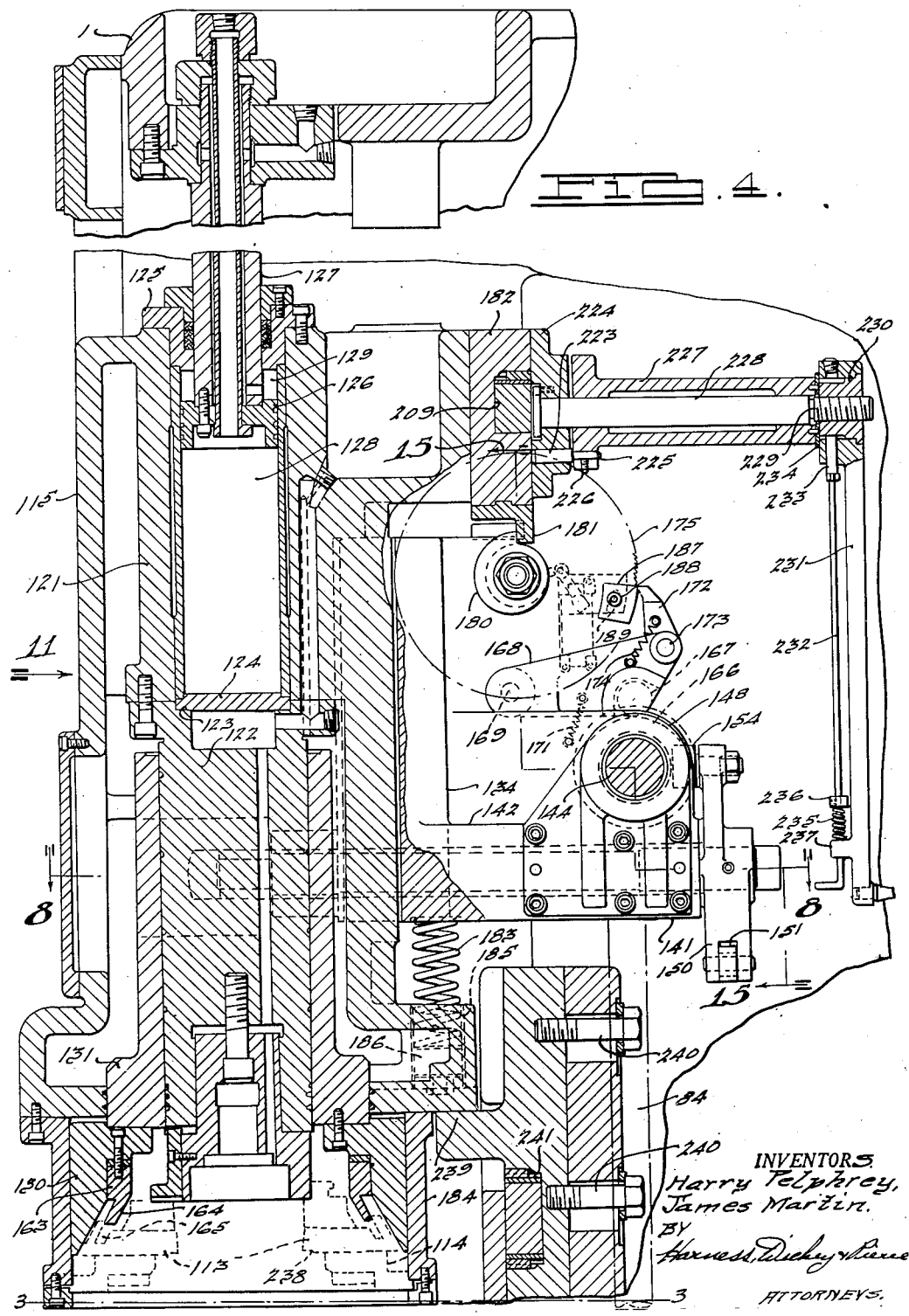
Figure 4 is a sectional elevation of the upper left side of the machine which is that portion of the machine included between line 3—3 and the top.

It may be seen in Figure 4 that the head 115 rests upon foot 239 provided by base 1 when the machines is in operating position. Such foot 239 is secured to base 1 by bolts 240 and upon loosening such bolts may be lowered by means of the following apparatus.

This foot portion 239 provides a groove 241 in which wedge 242 is slidably positioned. Wedge 242 provides an upper inclined surface 243 and a lower inclined surface 244 adapted to slide between the wear plates 245 at the top, and 246 at the bottom, which are keyed to the foot portion 239. After bolts 240 are loosened, it will be appreciated that as the wedge member 242 moves laterally in groove 241, foot portion 239 will shift.

Lateral movement of wedge 242 is effected by means of feed screw 247 which threadably engages a tapped opening 248 in such wedge. This feed screw is journaled for rotation in bearing block 249 anchored to base 1. As such feed screw 247 is rotated, wedge 252 is effected to slidably move in groove 241. In order to effect this rotation of the feed screw 247, a conveniently accessible hand wheel 250 is provided at the opposite end of such feed screw. When foot portion 239 has been adjusted to a predetermined location, it may be securely held in such position by re-tightening the bolts 240.

As a means of retaining wedge 242 within the groove 241, a cover plate 251 is provided to be anchored by means of a plurality of screws 252 to such foot member 239. This cover plate 251 provides an opening 253 therein through which foot 239 may extend and be moved in this manner as it supports the head assembly 115.

In order to prevent further rotation of feed screw 247 after foot member 239 has been located in a predetermined position, hand screw 254, threadably received by bearing block 249, is turned inwardly. In this position, the end of such screw 254 bears against said feed screw 247 rigidly and positively locking against further rotation.

Inasmuch as lock bars 197 and 198 must be in a retracted position when head 115 is brought to a new position by means of foot member 239, it will be obvious that openings 255 and 256 in lock blocks 258 and 259, respectively, for receiving lock pins 197 and 198, will be moved downwardly with said head 115. When so moved downwardly, such openings 255 and 256 will no longer mate lock bars 197 and 198, and adjustment must be provided to again bring the lock bars 197 and 198 into position to mate such openings.

It will be observed in Figure 9, by again considering only one of the lock bars inasmuch as each is identical, that hydraulic cylinder 200 is secured to casing 260 which is in surrounding relationship to sleeve 261 in which lock bar 198 is slidably positioned. The casing 260 is in turn secured to the base portion 1 of the machine by means of the retainer ring 262. Upon loosening bolts 263 which hold such retainer ring 262 to base 1, casing 260 may be rotated. Casing 260 provides at 264 gear teeth adapted to mesh the teeth of worm 265 which is rotatably supported by shaft 266. Such shaft 266 is journaled for rotation in bearing provided in opening 267 in base 1 and in the bearing housing 268 anchored to such base 1. This shaft 266 provides at 269 a squared end which may be engaged by a wrench or other suitable means for effecting rotation of said shaft. As the shaft is thus rotated, the worm 265 rotates casing 260 by means of the gear teeth 264 thereon. Casing 260 being eccentric to the center of lock bar 198, effects such lock bar 198 to be moved into vertical adjustment with lock block 259.

Rotation of casing 260, however, moves lock bar 198 out of lateral adjustment with the lock block 259, and to provide for this shifting, said lock block may be moved laterally upon loosening bolt 270. When bolt 270 is loosened, lock block 259 may be moved into position to receive lock pin 198 and the bolt again tightened to hold such lock in the proper position.

In a similar manner, lock bar 197 may be adjusted to mate the lock block 258 after head 115 has been lowered.

The automatic work cycle may be initiated by pressing simultaneously both motor start button 271 and hydraulic start button 272. This effects motor 30 to start driving hydraulic pump 273 which delivers fluid under pressure through line 274 and port 275 to four-way valve 276. Simultaneously, solenoid 277 on valve 276 is energized shifting the piston in such valve so as to permit the pressurized fluid to flow out of port 278 through line 279 to line 280. From line 280, the fluid enters passageway 281 which delivers it to chamber 128 provided in hydraulic cylinder 122. As fluid under pressure enters chamber 128, head 115 moves downwardly. At the same time, fluid in line 280 is delivered to port 282 of work clamp cylinders 283. From port 282, such fluid enters chamber 284 of the cylinder, causing piston 285 and rod 286 to move inwardly for effecting gear blank 19 to be rigidly and positively clamped in position in workholder 17. Inasmuch as the hydraulic circuit is closed, the downward movement of piston 126 in cylinder 122 effects fluid in chamber 129 to be exhausted therefrom through passageway 287 and line 288 to line 289 and port 290 on four-way valve 276. This fluid then leaves said valve by way of port 291 and line 292 for return to reservoir 293. Likewise, fluid in chamber 294 of cylinder 283 is exhausted by way of port 295 to line 296 for return to reservoir 293.

Figure 1:
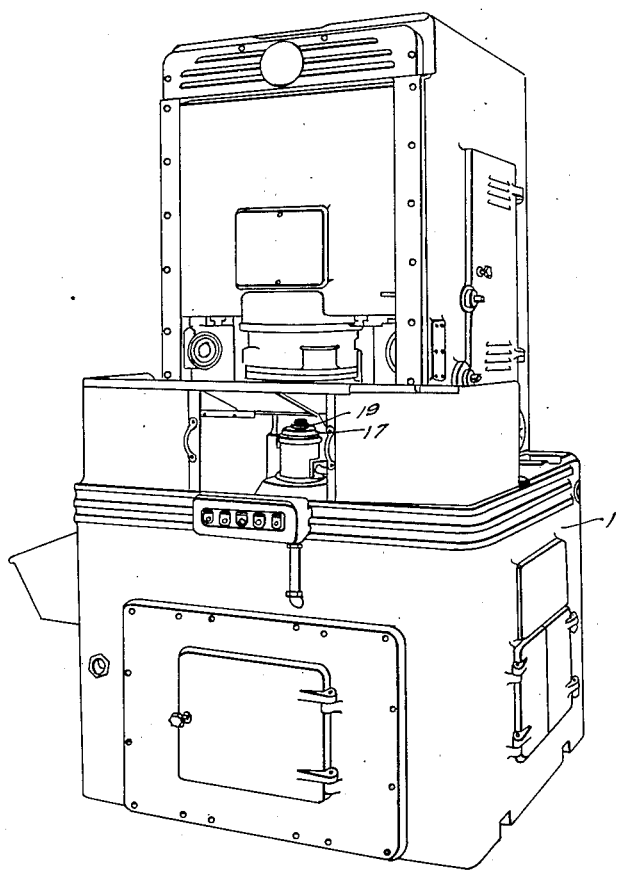
Figure 1 is a perspective view of a gear forming machine for simultaneously forming all the teeth of a gear, which machine embodies the improvements of the present invention.
Figure 2:
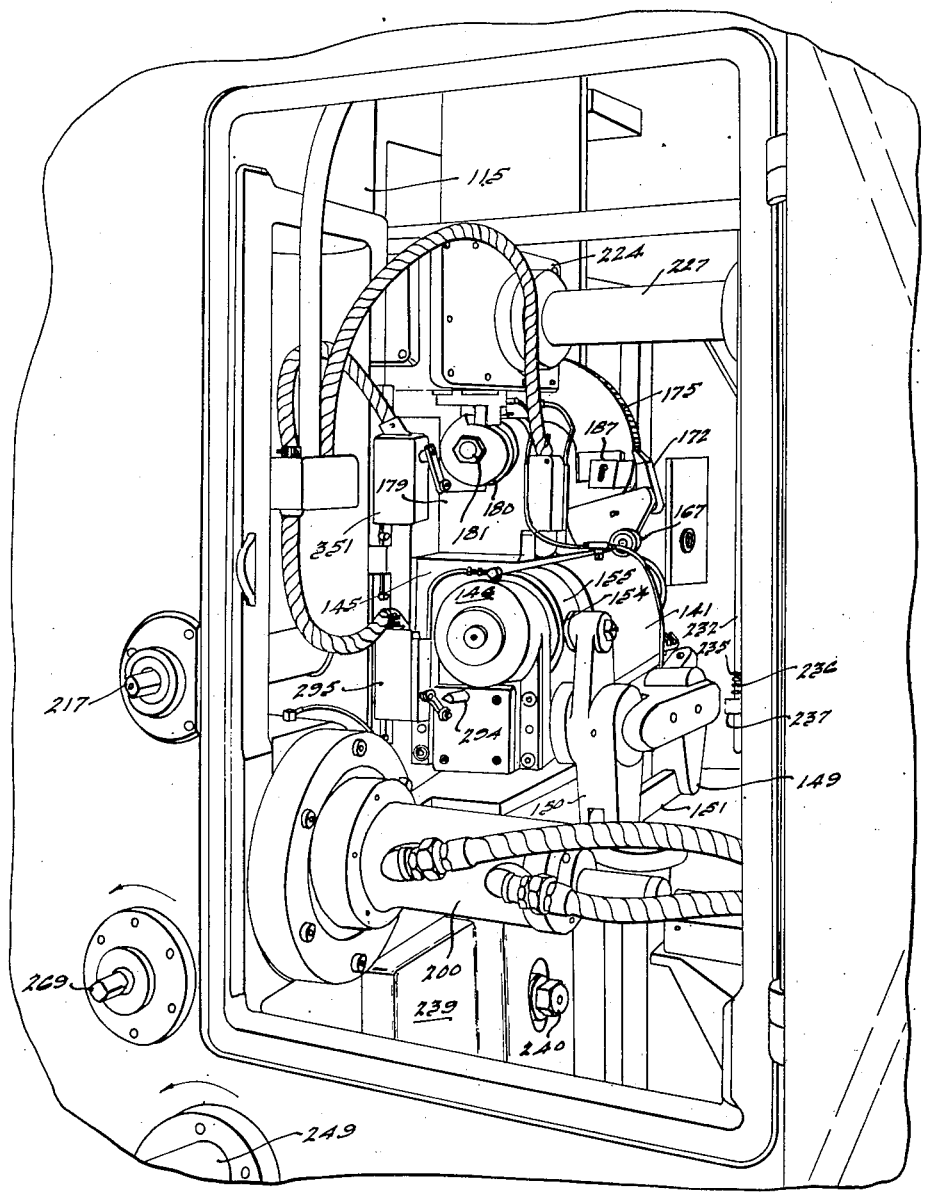
Figure 2 is a perspective view of a part of the left side of the machine of Figure 1 with an access door removed to illustrate certain of the apparatus located interiorly of the base.
Figure 3:
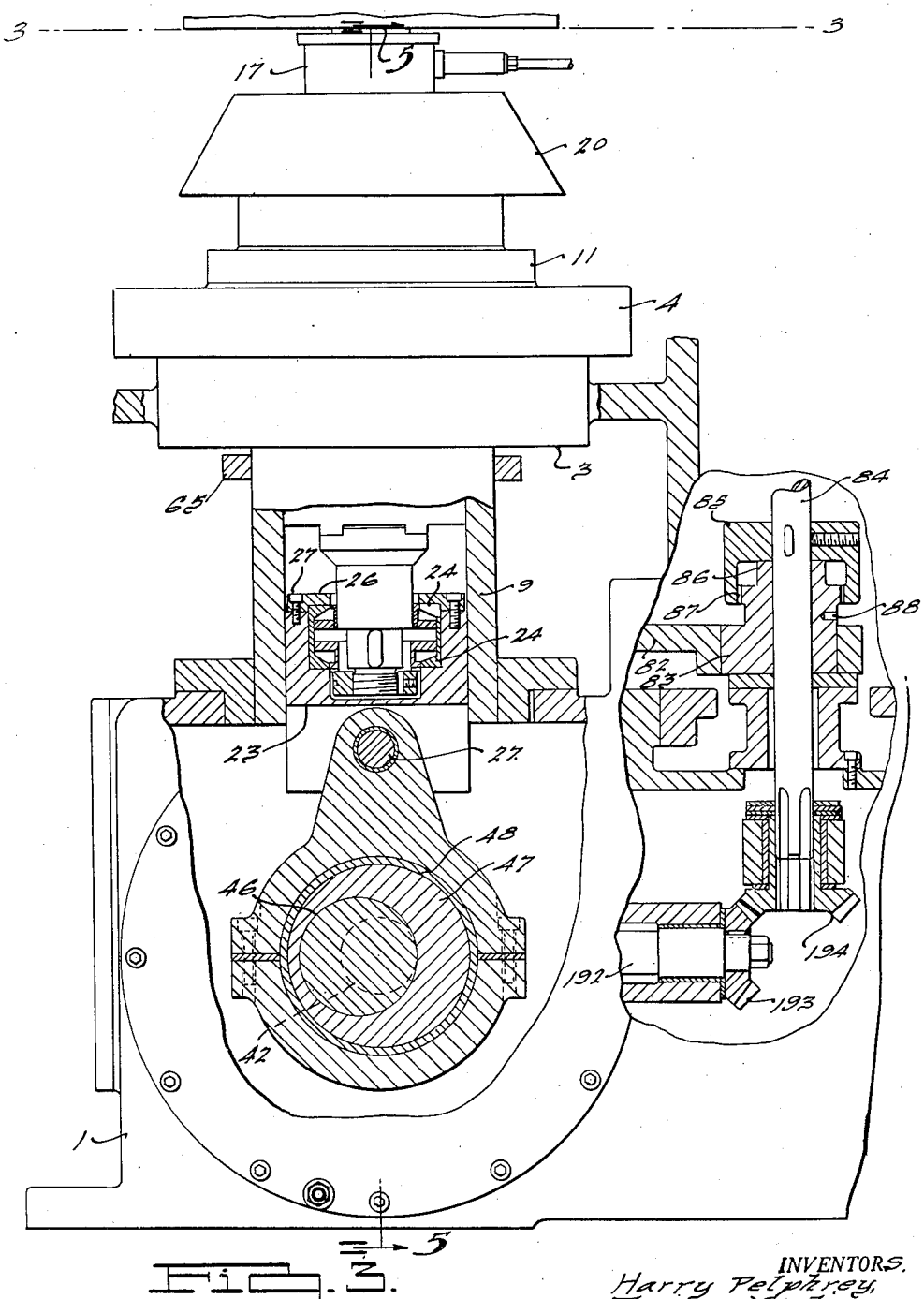
Figure 3 is a sectional elevation of the left side of the machine, illustrating that portion of such machine which is included between the bottom thereof and line 3—3.

When head 115 reaches the limit of its downward travel, pin 294, which may be seen in Figure 2 and which is only diagrammatically illustrated in Figure 16, contacts limit switch 295, energizing solenoid 296 on four-way valve 297. Thus, actuated, valve 297 shifts, permitting fluid under pressure from line 298 to enter port 299 and flow through said valve leaving the same by way of port 300 to enter line 301. Line 306 delivers such fluid to port 302 of the sequence valve 303 which it leaves by way of port 304 entering line 305, which delivers the same to line 306 and then to 307 ports and 308 of hydraulic cylinders 200 and 309. From port 307 such fluid enters chamber 203, while that from port 308 enters chamber 310 in the respective hydraulic cylinders effecting lock bars 197 and 198 to move into locking position. Following this, the hydraulic pressure builds up in sequence valve 303, which opens at a pre-set pressure and allows the fluid to flow out of port 311 on said valve into line 312 to port 313 of the clutch control cylinder 314. This fluid passes through said port 313 into chamber 315 of the clutch control cylinder causing piston 316 therein to move clutch 32 into an engaged position. When clutch 32 becomes engaged, crank 30 is set into motion by the previously described driving means.

As pressurized fluid enters chambers 203 and 310, exhaust fluid leaves chambers 204 and 316 by way of ports 317 and 318, respectively, to lines 319 and 320 for port 321 on sequence valve 322. This fluid passes through said valve, leaving through port 323 and entering line 324 for return to port 325 of valve 297 to be exhausted by way of port 326 and line 327. Likewise, fluid is exhausted from chamber 328 of cylinder 314 by way of port 329 and line 330 to port 331 of valve 322 for return.

As the clutch becomes fully engaged, lever 317 actuated by piston 316 contacts limit switch 318, de-energizing solenoid 277 on four-way valve 276 and solenoid 296 on four-way valve 297. This action is provided to guarantee positive positioning of the four-way valves 276 and 297, and to remove them from the circuit after their purpose has been accomplished.

In the foregoing, the oscillation of ram guide housing 9 due to the action of the variable spiral guide means has been described. In connection with this oscillation of the ram guide housing 9, the function of rotatable shaft 98 has also been described. As shaft 98 rotates in the described manner, contact arm 103 thereon engages limit switch 102 energizing solenoid 332 on four-way valve 104. Energization of solenoid 332 shifts valve 104, permitting fluid from line 333 to enter port 334 and pass through said valve to port 335 into line 336. Fluid from this line 336 enters port 337 on lock cylinder 106, passing into chamber 105 thereof. As the fluid enters chamber 105, lock pin 107 moves into locking position for holding ram guide 9 against further oscillation. Fluid from chamber 338 of lock cylinder 106 is exhausted by way of port 339 to line 340, thence to port 341 on valve 104 and by way of port 342 and line 343 to line 292 and is returned to reservoir 293.

At the termination of the work cycle, limit switch 344 is contacted by contactor 345 on shaft 176 which shaft carries the previously described ratchet wheel 175. This effects actuation of solenoid 346 causing four-way valve 297 to again shift. This permits fluid under pressure to leave such valve 297 by way of port 325 and enter into line 324 which delivers it to port 323 of sequence valve 322 which it leaves by way of port 331 entering line 330 to port 329 and chamber 328 of clutch cylinder 314, effecting disengagement of clutch 32, stopping crank 30. Following this, the pressure will build up in sequence valve 322 which opens and shifts at a present pressure and allows the fluid to flow from port 321 into line 320 and 319 which deliver it to ports 317 and 318 on lock bar cylinders 200 and 309, respectively. Said ports deliver the fluid into chambers 204 and 316 for effecting unlocking of lock bars 197 and 198.

Simultaneously with the actuation of solenoid 346, upon contact of limit switch 345, solenoid 347, on four-way valve 104, is actuated. This permits fluid under pressure to leave such valve by way of port 341 for line 340 which delivers the same to port 339 on cylinder 106. Through this port, such fluid enters chamber 338, effecting retraction of lock pin 107, freeing ram guide housing for oscillation on the next reciprocation of the gear blank.

When lock bars 197 and 198 return, limit switches 348 and 349 are actuated, energizing solenoid 350 on valve 276. Limit switches 348 and 349 are connected in series and both must be closed at the same time. This insures that both lock bars are out of engagement with said head 115 before the same moves upwardly.

When solenoid 350 is energized, it causes valve 276 to shift again, permitting the pressurized fluid to leave such valve by way of port 290 and pass into line 289 from whence it travels by way of line 288 into passageway 287 of hydraulic cylinder 122. As the fluid enters chamber 129 by way of passageway 287 in said hydraulic cylinder 122, it will be observed that the head 115 will be moved upwardly. At the same time, fluid from line 288 enters port 295 on clamp cylinder 283 and passes into chamber 294 thereof for unlocking the work holder so that the completed gear may be moved therefrom.

As the head 115 approaches the limit of its upward travel, pin 294 thereon engages limit switch 351. This deenergizes solenoids 350 and 346 on valves 276 and 297, respectively, placing the machine in readiness for its next work cycle upon re-activation of hydraulic start button 272.

During this retracting portion of the gear forming cycle, exhaust fluid from the respective cylinders is returned through the line previously under pressure to the respective four-way valves for return to reservoir 293.

As another means of effecting oscillation of ram guide housing 9, a modified structure is shown in Figures 18 and 19. In this modified structure, crank 352 is driven by means of a variable eccentric 83 and shaft 84. Crank 352, a link 353 and link 354 are connected by means of pins 355 to opposite sides of said links in spaced, parallel relationship.

Link 353 is pinned at 69 to lever 67 of the ring 65 and link 354 is pinned at 356 to lever 357. Lever 357 is pinned at 358 to an upwardly directed portion 359 of base 1 for arcuate movement about such pin 358. Lever 357 is also connected by means of pin 360 to crank 361. Such crank 361 provides an opening in its end to receive the eccentric 362 which is secured at 363 to a splined shaft 364.

Inasmuch as shaft 84 and shaft 362 rotate in timed relationship in a manner to be later described, as eccentric 83 effects movement of crank 352, eccentric 365 effects movement of crank 361. This movement of crank 352 causes link 353 to oscillate lever 67 which is integrally connected to ring 65, thereby effecting oscillation of the ram guide housing 9. At the same time, crank 361 causes lever 357 to move arcuately about point 360, moving pin 356 inwardly until its center coincides vertically with that of pin 69, at which time the oscillation of ram guide 9 ceases. This oscillation of ram guide 9, ceases as has been described in the foregoing, when the cutting tools 113 have nearly reached the base circle of the gear being formed.

Eccentric 362 has gear 364 integral therewith. As such eccentric rotates, gear 364 which meshes the teeth on rack 366 serves to move such rack and its integral piston 367 outwardly. Such piston 367 is contained within hydraulic cylinder 368 and after the forming operation has been completed, is returned from this outward position when fluid enters chamber 369 thereof through port 370. Returning piston 367 in this manner, effects rack 366 also to return, rotating eccentric 362 serving to cause the entire mechanism to be placed in position for the next forming operation.

In order to effect driving of shaft 362 in timed relation with shaft 84, a gear 371 is rotatably supported by shaft 176 which shaft is driven by means of the previously described ratchet 175. Such gear 371 meshes gear 372 rotatably supported by shaft 373. This shaft 373 is journaled for rotation in bearing supports 374 and 375 which are upwardly directed from the portion 141 of carriage 134. Also secured to shaft 373, is the bevel gear 376. Such bevel gear 376 meshes a bevel gear 377 which has its hollow shaft 378 journaled for rotation within bearing housing 379. This hollow shaft 378 is adapted to receive splined shaft 380. A universal 381 connects shaft 380 to shaft 362, and thus it may be seen that upon rotation of the ratchet 175 effecting rotation of shaft 176, said shaft 362 will be rotated, as the gearing and shafting interconnecting the same with shaft 84, is driven by said shaft 84.

It will be clear from the foregoing description that the machine for forming gears shown in the drawings and described above has been illustrated and described in rather specific detail. Obviously, many modifications, changes, and departures from the above described construction may be made without departing from the spirit and scope of the invention as set forth in the subjoined claims.

We claim:

1. In a machine for forming simultaneously a plurality of teeth in a gear blank comprising, a base, a reciprocating ram mounted in said base, means to effect reciprocation of said ram, a ram guide housing mounted in said base in spaced, surrounding relationship to the ram, a spiral guide fixed to the ram within the ram housing, complementary spiral guides fixed interiorly of the ram guide housing, said guides proving mating spiral surfaces for effecting partial rotation of the ram about its longitudinal axis in accordance to the helix of a gear to be formed as said ram reciprocates, a lever secured to the ram guide housing, a crank pinned to said lever, a rotatable eccentric operatively associated with said crank, the rotation of said eccentric moving said crank, movement of said crank effecting rotation of said lever and ram guide housing for reducing the spiral angle followed by the ram during part of the operating cycle, and driving means to effect rotation of said eccentric.

2. In a machine for forming simultaneously a plurality of teeth in a gear blank comprising, a base, means mounting a work holder on said base, said work holder adapted to mount a gear blank for reciprocation and partial rotation therewith, means to reciprocate said work holder, spiral guides for effecting partial rotation of said work holder in accordance to the helix of a gear to be formed on said blank, a toolholder mounted on said base, said toolholder adapted to mount a plurality of said cutting tools in circumferentially spaced radial relationship to said gear blank, each of said tools being at a predetermined angle to the longitudinal axis of a gear blank which angle is substantially the outside helix angle of the gear to be formed, a lever operatively associated with the work holder, a driven crank, and driving means interconnecting said lever and crank to effect a partial rotation of the lever and work holder opposite to that effected by the spiral guides, said counter rotation changing the spiral path followed by the gear blank for permitting the cutting tools to contact said gear blank along a substantially constant helical path during a predetermined portion of the gear forming cycle.

3. In a machine for forming simultaneously a plurality of teeth in a gear blank, comprising, a base, means mounting a work holder on said base, said work holder adapted to mount a gear blank for reciprocation and partial rotation therewith, means to reciprocate said work holder along its longitudinal axis, spiral guides operatively associated with the work holder for effecting partial rotation of said gear blank in accordance to the helix of a gear to be formed on said blank, a toolholder mounted in said base, said toolholder adapted to mount a plurality of cutting tools in circumferentially spaced, radial relationship to said gear blank, each of said tools being at a predetermined angle to the longitudinal axis of the gear blank which angle is substantially the outside helix angle of the gear to be formed, a lever secured to the work holder, mounting means, a driven crank, driving means interconnecting said lever and crank to effect a partial rotation of the work holder opposite to that effected by the spiral guides, said counter rotation permitting the cutting tools to contact the gear blank along a substantially constant helical path during part of the gear forming cycle, and a shiftable center operatively associated with said lever to terminate such counter rotation at a predetermined time.

4. In a machine for forming simultaneously a plurality of teeth in a gear blank comprising, a base, means mounting a work holder on said base, said work holder adapted to mount a gear blank for reciprocation and partial rotation therewith, means to reciprocate said work holder along its longitudinal axis, spiral guides operatively associated with the workholder for effecting partial rotation of the gear blank in accordance with the helix of a gear to be formed thereon, a toolholder mounted in said base, said toolholder adapted to mount a plurality of cutting tools in circumferentially spaced, radial relationship to said gear blank, each of said tools being at a predetermined angle to the longitudinal axis of the gear blank, which angle is substantially the outside helix angle of the gear to be formed, a lever secured to the work holder, mounting means, driven crank, driving means interconnecting said lever and crank to effect partial rotation of said work holder opposite to that effected by the spiral guides, said counter rotation maintaining the path of contact between the cutting tools and gear blank constant during part of the gear forming cycle, and a shiftable cutter operatively associated with said lever to terminate such counter rotation at a predetermined time, said spiral guides continuing rotation of the work holder for the balance of the forming operation.

5. In a machine for forming simultaneously a plurality of teeth in a gear blank comprising, a base, means mounting a work holder on said base, said work holder adapted to mount a gear blank for reciprocation and partial rotation therewith, spiral guides operatively associated with the work holder for effecting partial rotation of said gear blank in accordance to the helix of a gear to be formed on said blank, a toolholder mounted on said base, said toolholder adapted to mount a plurality of cutting tools in circumferentially spaced, radial relationship to said gear blank, each of said tools being at a predetermined angle to the longitudinal axis of the gear blank which angle is substantially the outside helix angle of the gear to be formed, a lever, secured to the work holder, mounting means, a driven crank, means interconnecting said lever and crank to effect a partial rotation of said work holder opposite to that effected by the spiral guides, said counter rotation maintaining the path of contact between the cutting tools and gear blank constant during part of the gear forming cycle, a shiftable center operatively associated with said lever to terminate such counter rotation at a predetermined time, said spiral guides continuing rotation of the work holder for the balance of the forming operation, and common means to effect reciprocation of the work holder and drive said crank in synchronism.

6. In a machine for forming simultaneously a plurality of teeth in a gear blank comprising, a base, means mounting a work holder on said base, said work holder adapted to mount a gear blank for reciprocation and partial rotation therewith, means to reciprocate said work holder, spiral guides operatively associated with said work holder for effecting partial rotation of said work holder in accordance to the helix of a gear to be formed on said gear blank, a toolholder mounted in said base, said toolholder adapted to mount a plurality of cutting tools in circumferentially spaced, radial relationship to said gear blank, each of said tools being at a predetermined angle to the longitudinal axis of a gear blank which angle is substantially the outside helix angle of the gear to be formed, a lever on the workholder mounting means, a driven crank, and driving means interconnecting said lever and crank to effect a partial rotation of the work holder opposite to that effected by the spiral guides, said counter rotation changing the spiral path followed by the gear blank thereby maintaining a substantially constant helical path by contact between the cutting tools and the gear blank constant during a predetermined portion of the gear forming cycle, such counter rotative movement of the work holder being greatest when the cutting tools engage the periphery of the gear blank and diminishing to zero as said tools move toward the base circle of the gear being formed.

7. In a machine for forming simultaneously a plurality of teeth of a gear blank comprising, a base, means mounting a work holder on said base, said work holder adapted to mount a gear blank for reciprocation and partial rotation therewith, spiral guides operatively associated with the work holder for effecting partial rotation of the same in accordance to the helix of the gear to be formed on said blank, a head on said base, a toolholder mounted in said head, said toolholder adapted to mount a plurality of cutting tools in circumferentially spaced, radial relationship to said gear blank, each of said tools being at a predetermined angle to the longitudinal axis of the gear blank which angle is substantially the outside helix angle of the gear to be formed, a reciprocable cone in said head, a retainer ring carried by said cone, said cone and retainer ring contacting the cutting tool for effecting infeed and backoff of the same as said tools engage the gear blanks, a lever secured to the work holder mounting means, a driven crank, means interconnecting said lever and crank to effect oscillation of the work holder, said oscillation permitting infeed and backoff of the cutting tools without interference between the same and the flanks of the teeth being formed on the gear blank, and means to reciprocate the work holder and cone to drive said crank in synchronism.

8. In a machine for forming simultaneously a plurality of teeth in a gear blank, comprising, a base, means mounting a work holder on said base, said work holder adapted to mount a gear blank for reciprocation and partial rotation therewith, spiral guides operatively associated with the work holder for effecting partial rotation of the work holder in accordance to the helix of a gear to be formed on said blank, a head on said base, a toolholder mounted in said head, said toolholder adapted to mount a plurality of cutting tools in circumferentially spaced, radial relationship to said gear blank, each of said tools being at a predetermined angle to the longitudinal axis of the gear blank which angle is substantially the outside helix angle of the gear to be formed, a reciprocable cone in said head, a retainer ring carried by said cone, said cone and retainer ring contacting the cutting tool for effecting infeed and backoff of the same as said tools engage the gear blank, a lever secured to the work holder mounting means, a driven crank, means interconnecting said lever and crank to effect oscillation of the work holder, rotation of the work holder in one direction permitting infeed and backoff of the cutting tools without interference between the flanks of the teeth being formed on the gear blank while rotation in the opposite direction returns the work holder, and means to reciprocate the work holder and cone and drive said crank in synchronism.

9. In a machine for forming simultaneously a plurality of teeth in a gear blank comprising, a base, means mounting a work holder on said base, said work holder adapted to mount a gear blank for reciprocation and partial rotation therewith, spiral guides operatively associated with the work holder for effecting partial rotation of said work holder in accordance to the helix of the gear to be formed on said blank, a head on said base, a tool holder mounted on said head, said toolholder adapted to mount a plurality of cutting tools in circumferentially spaced, radial relationship to said gear blank, each of said tools being at a predetermined angle to the longitudinal axis of the gear blank which angle is substantially the outside helix angle of the gear to be formed, a reciprocable cone in said head, a retainer ring carried by said cone, said cone and retainer ring contacting the cutting tool for effecting infeed and backoff of the same as said tools engage the gear blank, a lever secured to the work holder mounting means, a driven crank, means interconnecting said lever and crank to effect oscillation of the work holder, such rotation of the work holder in one direction reducing the angular rotation of the same effected by the spiral guides thereby permitting infeed of the cutting tools without interference between the same and the flanks of the teeth being formed on the gear blank, the rotation of the work holder in an opposite direction returning the same for the next oscillation, and means to reciprocate the work holder and cone and drive said crank in synchronism.

10. In a machine for forming simultaneously a plurality of teeth in a gear blank comprising, a base, a reciprocable ram mounted in said base, a work holder on said ram, said work holder adapted to retain a gear blank, means to effect reciprocation of the ram, a ram guide housing mounted in spaced, surrounding relationship to the ram, a spiral guide fixed to the ram within the housing, complementary spiral guides interiorly of the ram guide housing, said guides providing spiral surfaces adapted to mate a spiral surface in the first mentioned guide for effecting partial rotation of the ram in accordance to the helix of a gear to be formed on said gear blank as the ram reciprocates, a lever secured to said ram guide housing, a driven crank pinned to said lever, means for driving said crank in timed relationship to the reciprocation of the ram, said crank effecting oscillation of the lever and guide housing simultaneously with the rotation of the ram effected by said spiral guides, a pawl fixed to said crank, a rotatable ratchet wheel driven by said pawl, and a shiftable center operatively associated with said ratchet wheel for terminating said oscillation of the ram guide housing at a predetermined time.

11. In a machine for forming simultaneously a plurality of teeth in a gear blank, a base, a reciprocable ram mounted in said base, a work holder in said ram, said work holder adapted to retain a gear blank, means to effect reciprocation of the ram, a ram guide housing mounted in spaced, surrounding relationship to the ram, a spiral guide fixed to the ram within the housing, complementary spiral guides interiorly of the ram guide housing, said guides providing spiral surfaces adapted to mate a spiral surface in the first mentioned guide for effecting partial rotation of the ram in accordance to the helix of the gear to be formed on said gear blank as the ram reciprocates, a lever secured to said ram guide housing, a driven crank pinned to said lever, means for driving said crank in timed relationship to the reciprocation of the ram, said crank effecting oscillation of the lever and guide housing simultaneously with the rotation of the ram during a portion of the gear forming cycle, a pawl fixed to said crank, a rotatable ratchet wheel driven by said pawl, a shiftable center operatively associated with said ratchet wheel for terminating said oscillation of the ram guide housing at a predetermined time, and a lock pin mounted on said base adapted to rigidly and positively lock the ram guide housing in position when such oscillation ceases.

12. In a machine for forming simultaneously a plurality of teeth in a gear blank comprising, a base, a reciprocable ram mounted in said base, a work holder on said ram, said work holder adapted to retain a gear blank, means to effect reciprocation of the ram, a ram guide housing mounted in spaced, surrounding relationship to the ram, a spiral guide fixed to the ram within the housing, complementary spiral guides interiorly of the ram guide housing, said guides providing spiral surfaces adapted to mate a spiral surface in the first mentioned guide for affecting partial rotation of the ram in accordance to the helix of the gear to be formed on said gear blank as the ram reciprocates, a lever secured to said ram guide housing, a driven crank linked to said lever and linked to a shiftable center, said center being located on an arcuately movable lever, said crank effecting oscillation of the ram guide housing until said shiftable center reaches a predetermined position causing the oscillation to cease, and driving means to move said second named lever in timed relation to the reciprocation of the ram.

13. In a machine for forming simultaneously all the teeth in a gear blank, the combination of a base, of a reciprocable ram, a work holder on said ram, said work holder adapted to retain a gear blank, a ram guide housing in spaced, surrounding relationship to the ram, spiral guide means operatively associated with the ram and guide housing to effect rotation of the work holder in accordance to the helix of the gear to be formed on the gear blank; means to oscillate the ram guide housing for decreasing the rotation of the work holder effected by the guides during part of the gear forming cycle, said means comprising a lever secured to the ram guide housing, a plate slidably mounted on the base, a block pivotally supported by said plate, a driven crank pinned to the pivot block, a pin in said lever slidably positioned in the pivot block, rotatable means on said base to effect sliding of the slidable plate for causing the longitudinal axis of the pivot point of the block to approach the longitudinal axis of the pin and the lever, said sliding movement gradually diminishing the oscillation of the ram guide housing as the distance between said longitudinal axes lessens, and means to reciprocate said ram and drive said crank in synchronism.

14. In a machine for forming simultaneously all of the teeth in a gear blank, in combination with a base, of a reciprocable ram, a work holder on said ram, said work holder adapted to retain a gear blank, a ram guide housing in spaced, surrounding relationship with the ram, spiral guide means operatively associated with the ram and guide housing to effect rotation of the work holder in accordance to the helix of the gear to be formed on the gear blank; means to oscillate the ram guide housing for decreasing the rotation of the work holder effected by said guides during part of the gear forming cycle, said means comprising a lever secured to the ram guide housing, a plate slidably mounted on the base, a block pivotally supported by said plate, a driven crank pinned to the pivot block, a pin in said lever slidably positioned in the pivot block, a pawl on said crank, a rotatable cam shaft on the base, a cam on said cam shaft in contacting relationship with the slidable plate, a ratchet wheel on said cam shaft, said pawl engaging the ratchet wheel for effecting rotation of the cam as the crank is driven, said rotation serving to cause the slidable plate to move to bring the longitudinal axis of the pivot point of the block toward the longitudinal axis of the pin and the lever, said movement diminishing the oscillation of the ram guide housing as the two axes approach, said oscillation stopping when said axes are vertically in line, and means to reciprocate the ram and drive said crank in synchronism.

15. In a machine for forming simultaneously all the teeth in a gear blank, in combination with a base, of a reciprocable ram, a work holder on said ram, said work holder adapted to retain a gear blank, a ram guide housing in spaced, surrounding relationship to the ram, spiral guide means operatively associated with the ram and guide housing to effect rotation of the work holder in accordance with the helix of the gear to be formed on the gear blank; means to oscillate the ram guide housing for decreasing the angular rotation of the work holder effected by said guides during part of the gear forming cycle, said means comprising a lever secured to the ram guide housing, a driven crank, a link pinned at one end to said lever and at the opposite end to said crank, a second driven crank, linkage interconnecting said crank, said first crank effecting oscillation of the ram guide housing during part of the gear forming cycle, said second crank effecting the longitudinal axis of a pivot point in the linkage to approach the longitudinal axis of the pin connecting the pin to the lever, said movement diminishing the oscillation of the ram guide housing as the two centers approach and stopping said oscillation when the same are vertically in line, and means to reciprocate said ram and drive said crank in synchronism.

16. In a machine for forming simultaneously a plurality of teeth in a gear blank comprising, a base, a head mounted on said base, a toolholder in said head, said toolholder adapted to mount a plurality of radially disposed cutting tools, means in said head to move the same from and to a retracted position, a ram in said head, a reciprocable sleeve in surrounding relationship to said ram, a carriage slidably mounted within said head, said carriage rotatably supporting a pair of eccentric shafts adapted to be received on diametrically opposed sides of the sleeve, a cone member fixedly secured to the sleeve, a retainer ring in said cone member, said cone member and retainer ring engaging the cutting tools, a rotatable cam for effecting partial rotation of said shafts, a second rotatable cam for effecting slidable movement of the carriage, the reciprocation of the sleeve serving to cause infeed and backoff of the cutting tool as the movement of the carriage simultaneously effects radial advance of said tools, and driving means to effect synchronous rotation of said cam.

17. In a machine for forming simultaneously a plurality of teeth in a gear blank, a base, a head mounted on said base, means in said head for moving the same from and to an operating position, a toolholder in said head, said toolholder adapted to mount a plurality of radially disposed cutting tools, a pair of lock blocks in said head, a shiftable stop on said base against which said head is disposed when in operating position, means to shift said stop for varying the position of the head to compensate for sharpening said tools, a pair of reciprocable lock bars mounted in said base adapted to enter the lock blocks in said head for positively locking the same in operating position, rotatable eccentric casings for said lock bars, gear means to effect rotation of said casings, said rotation effecting vertical line-up of the lock bars with the lock blocks when the position of the head is altered, means for laterally positioning said lock blocks for effecting lateral line-up of the same with the lock bars after the head position is altered, and means to effect movement of said lock bars to a retracted position at the termination of the gear forming cycle in order that the head may be moved to a retracted position.

HARRY PELPHREY.
JAMES MARTIN.

REFERENCES CITED

The following references are of record in the file of this patent:

UNITED STATES PATENTS

| Number | Name | Date |
|---|---|---|
| 2,346,867 | Pelphrey | Apr. 18, 1944 |